(12) United States Patent  
Ozawa et al.

(10) Patent No.: US 8,081,640 B2  
(45) Date of Patent: Dec. 20, 2011

(54) NETWORK SYSTEM, NETWORK MANAGEMENT SERVER, AND ACCESS FILTER RECONFIGURATION METHOD

(75) Inventors: Yoji Ozawa, Kokubunji (JP); Hideki Okita, Fuchu (JP)

(73) Assignee: Hitachi, Ltd., Tokyo (JP)

( * ) Notice: Subject to any disclaimer, the term of this patent is extended or adjusted under 35 U.S.C. 154(b) by 198 days.

(21) Appl. No.: 12/222,841

(22) Filed: Aug. 18, 2008

(65) Prior Publication Data

US 2009/0109970 A1   Apr. 30, 2009

(30) Foreign Application Priority Data

Oct. 24, 2007   (JP) ................................ 2007-276326

(51) Int. Cl.
*H04L 12/28* (2006.01)
(52) U.S. Cl. .......... 370/396; 370/389; 709/225; 726/11; 726/13
(58) Field of Classification Search .................. 370/389, 370/396; 709/225; 726/11–13
See application file for complete search history.

(56) References Cited

U.S. PATENT DOCUMENTS

| | | | | |
|---|---|---|---|---|
| 5,606,668 A * | 2/1997 | Shwed | | 726/13 |
| 5,968,176 A * | 10/1999 | Nessett et al. | | 726/11 |
| 6,032,194 A * | 2/2000 | Gai et al. | | 709/239 |
| 6,345,299 B2 * | 2/2002 | Segal | | 709/229 |
| 6,434,624 B1 * | 8/2002 | Gai et al. | | 709/232 |
| 6,578,076 B1 * | 6/2003 | Putzolu | | 709/223 |
| 6,738,377 B1 * | 5/2004 | Boden | | 370/392 |
| 7,051,365 B1 * | 5/2006 | Bellovin | | 726/11 |
| 7,054,930 B1 * | 5/2006 | Cheriton | | 709/226 |
| 7,143,438 B1 * | 11/2006 | Coss et al. | | 726/11 |
| 7,366,171 B2 * | 4/2008 | Kadambi et al. | | 370/389 |
| 7,536,715 B2 * | 5/2009 | Markham | | 726/11 |
| 7,710,957 B2 * | 5/2010 | Smith | | 370/389 |
| 2003/0110379 A1 * | 6/2003 | Ylonen et al. | | 713/164 |
| 2004/0109459 A1 * | 6/2004 | Madour et al. | | 370/401 |
| 2004/0205359 A1 * | 10/2004 | Matsuhira | | 713/201 |
| 2008/0089345 A1 * | 4/2008 | Cunetto et al. | | 370/396 |
| 2009/0052443 A1 * | 2/2009 | Kolenchery et al. | | 370/389 |
| 2009/0249468 A1 * | 10/2009 | Charzinski et al. | | 726/13 |

FOREIGN PATENT DOCUMENTS

| JP | 2001-249866 | 3/2000 |
|---|---|---|
| JP | 2003-244247 | 2/2002 |

* cited by examiner

*Primary Examiner* — Ricky Ngo  
*Assistant Examiner* — Ben Liu  
(74) *Attorney, Agent, or Firm* — Stites & Harbison PLLC; Juan Carlos A. Marquez, Esq.

(57) ABSTRACT

Provided is a network system, comprising: a plurality of network devices; a network constructed from the plurality of network devices; and a management server managing the network. The plurality of network devices include a first network device in which a filter assigned as a target of reconfiguration is set and a second network device coupled at a lower level of the first network device. The management server obtains topology of the network from the plurality of network devices; reconfigures, by referring to the obtained network topology, the filters of the first and second network device such that a range in which a packet can be forwarded through a reconfiguring filter set in the first network device is made equal to a range in which a packet can be forwarded through the filter set in the second network device; and sets the reconfigured filters into the network devices.

19 Claims, 34 Drawing Sheets

| NETWROK DEVICE ID ~5211 | PORT ID ~5212 | ADJACENT NETWORK DEVICE ID ~5213 | ADJACENT PORT ID ~5214 |
|---|---|---|---|
| 1 | 3 | --- | --- |
| 1 | 1 | 2 | 3 |
| 1 | 2 | 3 | 3 |
| : | : | : | : |

FIG. 4

| CPU LOAD (%) ~5231 | RECONFIGURATION FILTER NUMBER (RATIO) (%) ~5232 |
|---|---|
| 90~100 | 50 |
| 70~90 | 40 |
| 50~70 | 30 |

FIG. 5

| DEVICE TYPE ~5241 | MAXIMUM NUMBER OF FILTERS ~5242 |
|---|---|
| 1 | 1000 |
| 2 | 500 |
| 3 | 500 |
| : | : |

*FIG. 6*

| NETWORK DEVICE ID ~5291 | DEVICE TYPE ~5292 |
|---|---|
| 1 | 1 |
| 2 | 1 |
| 3 | 2 |
| : | : |

*FIG. 7*

| LAYER | FILTER TYPE ~5251 | | | | | | RECONFIGURING PRIORITY (SMALLER VALUE HAS HIGHER PRIORITY) ~5252 |
|---|---|---|---|---|---|---|---|
| | SOURCE FLAG | DESTINATION FLAG | PROTOCOL | FLOW DIRECTION | ACTION | | |
| L3 | PRESENCE | PRESENCE | SPECIFIED | Egress | Deny | | 1 |
| L3 | ABSENCE | PRESENCE | SPECIFIED | Egress | Deny | | 2 |
| L3 | PRESENCE | PRESENCE | NOT SPECIFIED | Egress | Deny | | 3 |
| L3 | ABSENCE | PRESENCE | NOT SPECIFIED | Egress | Deny | | 4 |
| L3 | PRESENCE | ABSENCE | SPECIFIED | Egress | Deny | | 5 |
| .. | .. | .. | .. | .. | .. | | .. |
| L2 | PRESENCE | ABSENCE | — | Egress | Deny | | 10 |
| .. | .. | .. | .. | .. | .. | | .. |

FIG. 8

RECONFIGURING PRIORITY USER INTERFACE

| FILTER TYPE/PRIORITY | |
|---|---|
| FILTER TYPE | |
| LAYER : | L3 |
| SOURCE FLAG : | ABSENCE |
| DESTINATION FLAG : | ABSENCE |
| PROTOCOL : | SPECIFIED |
| FLOW DIRECTION : | EGRESS |
| ACTION : | DENY |
| RECONFIGURING PRIORITY : | 6 |
| OK | CANCEL |

| NETWROK DEVICE ID | PORT ID | FILTER | FILTER APPLYING ORDER |
|---|---|---|---|
| 1 | 3 | (IP,192.168.20.0/24,any,SSH,Egress,Deny) | 1 |
| 1 | 3 | (IP,192.168.10.0/24,any,SSH,Egress,Deny) | 2 |
| .. | .. | .. | .. |
| 2 | 1 | (IP,192.168.10.0/24,any,SSH,Egress,Deny) | 1 |
| .. | .. | .. | .. |

5261 / 5262 / 5263 / 5264

| SETTING TIME 5271 | SOURCE NETWORK DEVICE 5272 | SOURCE PORT 5273 | FILTER 5274 | DESTINATION NETWORK DEVICE 5275 | DESTINATION PORT 5276 | FILTER 5277 |
|---|---|---|---|---|---|---|
| 2007-07-07 10:12:59 | 1 | 3 | (IP,192.168.20.0/24, any,SSH,Egress,Deny) | 2 | 3 | (IP,192.168.168.20.0/24, 192.168.10.0/24,SSH, Egress,Permit) (IP,192.168.168.20.0/24, 192.168.168.20.0/24,SSH, Egress,Permit) (IP,192.168.168.20.0/24, 192.168.30.0/24,SSH, Egress,Permit) (IP,192.168.168.20.0/24, 192.168.20.0/24,SSH, Egress,Permit) (IP,192.168.168.20.0/24, any,SSH,Egress,Deny) |
|  |  |  |  | 3 | 3 | (IP,192.168.168.20.0/24, 192.168.10.0/24,SSH, Egress,Permit) (IP,192.168.168.20.0/24, 192.168.168.20.0/24,SSH, Egress,Permit) (IP,192.168.168.20.0/24, 192.168.30.0/24,SSH, Egress,Permit) (IP,192.168.168.20.0/24, 192.168.20.0/24,SSH, Egress,Permit) (IP,192.168.168.20.0/24, any,SSH,Egress,Deny) |
| .. | .. | .. | .. | .. | .. | .. |

FIG. 11

| PORT | LAYER | SOURCE ADDRESS | DESTINATION ADDRESS | PROTOCOL | FLOW DIRECTION | ACTION |
|---|---|---|---|---|---|---|
| 3 | L3 | 192.168.10.0/24 | Any | SSH | Egress | Deny |
| 3 | L3 | 192.168.20.0/24 | Any | SSH | Egress | Deny |
| 3 | L3 | Any | Any | Telnet | Egress | Deny |
| .. | .. | .. | .. | .. | .. | .. |

*FIG. 13*

| PORT ID ~1221 | ADJACENT NETWORK DEVICE ID ~1222 | ADJACENT PORT ID ~1223 |
|---|---|---|
| 3 | — | — |
| 1 | 2 | 3 |
| 2 | 3 | 3 |
| : | : | : |

*FIG. 14*

| VLAN ID ~1231 | VLAN ASSIGNED PORT ~1232 |
|---|---|
| 10 | 1 |
| 20 | 1 |
| 20 | 2 |
| 30 | 2 |
| : | : |

*FIG. 15*

| DESTINATION ADDRESS ~1241 | INTERFACE ~1242 |
|---|---|
| 192.168.10.0/24 | VLAN INTERFACE 10 |
| 192.168.20.0/24 | VLAN INTERFACE 20 |
| 192.168.30.0/24 | VLAN INTERFACE 30 |
| ⋮ | ⋮ |

*FIG. 16*

| MESSAGE | SOURCE ADDRESS | DESTINATION ADDRESS | CONTENT |
|---|---|---|---|
| CPU LOAD | UPPER NETWORK DEVICE | MANAGEMENT SERVER | CPU LOAD |
| PHYSICAL CONNECTION INFORMATION | UPPER NETWORK DEVICE/ LOWER NETWORK DEVICE | MANAGEMENT SERVER | PHYSICAL CONNECTION INFORMATION |
| IP NETWORK INFORMATION | UPPER NETWORK DEVICE/ LOWER NETWORK DEVICE | MANAGEMENT SERVER | VLAN SETTING TABLE ROUTE INFORMATION |
| FILTER ENTRIES | UPPER NETWORK DEVICE/ LOWER NETWORK DEVICE | MANAGEMENT SERVER | EXISTING FILTER ENTRIES |
| REQUEST FOR APPROVAL | MANAGEMENT SERVER | ADMINISTRATOR TERMINAL | FILTER CONFIGURATION |
| SETTING OF FILTER | MANAGEMENT SERVER | UPPER NETWORK DEVICE/ LOWER NETWORK DEVICE | FILTER ENTRIES |
| REQUEST FOR FILTER CONFIGURATION | ADMINISTRATOR | MANAGEMENT SERVER | TIME FOR DESIRED NETWORK CONFIGURATION |
| FILTER CONFIGURATION SETTING RESULT | MANAGEMENT SERVER | ADMINISTRATOR TERMINAL | NETWORK CONFIGURATION |

*FIG. 18*

N1: FILTER SOURCE NETWORK DEVICE
SP1: PORT WHERE F1 IS SET IN N1
TN2: TARGET NETWORK DEVICE
TP2: TARGET PORT

| MESSAGE | SOURCE ADDRESS | DESTINATION ADDRESS | CONTENT |
|---|---|---|---|
| REQUEST FOR FILTER RECONFIGURATION | ADMINISTRATOR | MANAGEMENT SERVER | TARGET NETWORK DEVICE, NUMBER OF RECONFIGURED FILTERS |

FILTER RECONFIGURATION THRESHOLD USER INTERFACE

| FILTER RECONFIGURATION | | |
|---|---|---|
| TARGET NETWORK DEVICE: | NETWORK DEVICE 1 | |
| TARGET PORT: | 1 | |
| NUMBER OF RECONFIGURING FILTERS: | 10 | |
| OK | CANCEL | |

*FIG. 24*

| | FILTER TYPE 5251 | | | | | RECONFIGURING PRIORITY 5252 | RECONFIGURATION POLICY ID 5253 |
|---|---|---|---|---|---|---|---|
| LAYER | SOURCE FLAG | DESTINATION FLAG | PROTOCOL | FLOW DIRECTION | ACTION | | |
| L3 | PRESENCE | ABSENCE | SSH | Egress | Deny | 1 | 2 |
| L3 | PRESENCE | ABSENCE | Telnet | Egress | Deny | 2 | 3 |
| .. | .. | .. | .. | .. | .. | .. | .. |
| L3 | PRESENCE | PRESENCE | SPECIFIED | Egress | Deny | 11 | 1 |
| L3 | ABSENCE | PRESENCE | SPECIFIED | Egress | Deny | 12 | 2 |
| L3 | PRESENCE | PRESENCE | NOT SPECIFIED | Egress | Deny | 13 | 3 |
| .. | .. | .. | .. | .. | .. | .. | .. |

FIG. 26

| RECONFIGURATION POLICY ID ~5281 | RECONFIGURATION POLICY ~5282 |
|---|---|
| 1 | SINGLE RECONFIGURATION |
| 2 | RECURSIVE RECONFIGURATION (TO NETWORK DEVICES THAT COVER SOURCE NETWORK DEVICES) |
| 3 | RECURSIVE RECONFIGURATION (TO EDGE NETWORK DEVICE) |

FIG. 27

RECONFIGURATION POLICY USER INTERFACE

| FILTER TYPE/PRIORITY/ RECONFIGURATION POLICY |

FILTER TYPE
- LAYER : L3
- SOURCE FLAG : ABSENCE
- DESTINATION FLAG : ABSENCE
- PROTOCOL : SPECIFIED
- FLOW DIRECTION : Egress
- ACTION : Deny

RECONFIGURING PRIORITY : 6

RECONFIGURATION POLICY : RECURSIVE RECONFIGURATION (TO NETWORK DEVICES THAT COVER SOURCE NETWORK DEVICES)

[ OK ]  [ CANCEL ]

*FIG. 28*

| SETTING TIME | SOURCE NETWORK DEVICE | SOURCE PORT | FILTER | DESTINATION NETWORK DEVICE | DESTINATION PORT | FILTER |
|---|---|---|---|---|---|---|
| 2007-07-07 10:12:59 | 1 | 3 | (IP,192.168.10.0/24, any,SSH,Egress,Deny) | 4 | 3 | (IP,192.168.20.0/24,SSH,Egress,Permit) (IP,192.168.10.0/24, 192.168.30.0/24,SSH,Egress,Permit) (IP,192.168.10.0/24, 192.168.168.10.0/24, any,SSH,Egress,Deny) |
| 2007-07-07 10:12:59 | 1 | 3 | (IP,192.168.10.0/24, any,Telent,Egress,Deny) | 7 | 3 | (IP,192.168.10.0/24, 192.168.20.0/24,Telnet,Egress,Permit) (IP,192.168.10.0/24, 192.168.30.0/24,Telnet,Egress,Permit) (IP,192.168.10.0/24, 192.168.10.0/24, any,Telnet,Egress,Deny) |
| | | | | 8 | 3 | (IP,192.168.10.0/24, 192.168.20.0/24,Telnet,Egress,Permit) (IP,192.168.10.0/24, 192.168.30.0/24,Telnet,Egress,Permit) (IP,192.168.10.0/24, 192.168.10.0/24,any,Telnet,Deny) |

FIG. 29

| MESSAGE | SOURCE FLAG | DESTINATION FLAG | CONTENTS |
|---|---|---|---|
| REQUEST FOR NEW FILTER ENTRY ADDITION | ADMINISTRATOR | MANAGEMENT SERVER | FILTER TARGET NETWORK DEVICES, FILTER TARGET PORTS, FILTER ENTRY |

FILTER ADDITION USER INTERFACE

| FILTER ADDITION | |
|---|---|
| TARGET NETWORK DEVICE : | NETWORK DEVICE 1 |
| TARGET PORT: | 1 |

FILTER ADDITION

| LAYER : | IP |
|---|---|
| SOURCE FLAG : | 192.168.30.0/24 |
| DESTINATION FLAG : | Any |
| PROTOCOL : | SSH |
| FLOW DIRECTION : | Egress |
| ACTION : | Deny |

OK   CANCEL

*FIG. 34*

NETWORK SYSTEM, NETWORK MANAGEMENT SERVER, AND ACCESS FILTER RECONFIGURATION METHOD

CLAIM OF PRIORITY

The present application claims priority from Japanese patent applications JP 2007-276326 filed on Oct. 24, 2007, the content of which is hereby incorporated by reference into this application.

BACKGROUND OF THE INVENTION

This invention relates to a network system in which filtering of packets is performed, and more particularly, to a management device for performing automatic reconfiguration of filters.

In recent years, attention is focused on security in IT systems. Detailed access control is required for the purpose of prevention of unauthorized access from an internal network under own administration to the inside or the outside of the internal network and blocking of unauthorized flow and the like. Thus, in order to achieve this detailed access control, a large number of filters need be set.

Design of filter configurations, setting into individual network devices, and management of the filter setting are complicated. Thus, in general, filters are set collectively in an upper network device (e.g., core switch). Nevertheless, when a large number of filters are set in the upper network device, the load of retrieving the filters increases in the upper network device. Then, this load increase causes delay in packet forwarding. Further, loss of control packets inhibits normal network operation.

Further, when the number of filter entries set in a network device increases, it exceeds the number of filter entries that can be set in the network device. This causes insufficiency of the resources of the network device. Then, when the resources are insufficient, filters for implementing security policies cannot be set additionally.

One of known methods for reducing the load of a network device in which a large number of filters are set and thereby resolving the resource insufficiency is distributed installation of the filters.

JP 2003-244247 A discloses a method in which filters are set in an internal network in a distributed manner.

In the method disclosed in JP 2003-244247 A, filters are installed in a distributed manner to external filters each installed at a node to an external network and to internal filters installed in the internal network. Then, a filter management server is provided that performs centralized control of the external filters and the internal filters such that filter rules causing a heavy load should be set in the individual internal filters.

Further, JP 2001-249866 A discloses a method in which, in a service provider network, filters are installed in a distributed manner from a fire wall server to edge nodes.

In the technology disclosed in JP 2001-249866 A, when the load of the firewall server increases, at least a part of the filtering rules set in the firewall is distributed to a particular edge node. Then, the particular edge node performs filtering based on the distributed filtering rules.

The method disclosed in JP 2003-244247 A has a first problem described below. Further, the method disclosed in JP 2001-249866 A has second and third problems described below.

The first problem is difficulty in determining whether a policy of filtering can be realized in each internal filter and the external filter.

The second problem is that when a filter for denying packet forwarding is distributed from the firewall server to an edge node, the effect of filtering can vary in some cases.

The third problem is that filters can be distributed only from the firewall server to the edge nodes.

First, the first problem will be described below.

In a policy of filtering, a source address or a destination address need to be specified. Thus, in determining whether a policy of filtering can be realized, an in-network location corresponding to the source address or the destination address specified in the policy needs to be recognized. Thus, in setting a filter for a policy, network topology needs to be taken into consideration. Nevertheless, in the method disclosed in JP 2003-244247 A, filter setting cannot be performed in consideration of network topology.

Further, in order to generate network topology, network administrators and SEs need to collect physical coupling relation of a large number of network devices (information concerning relation of physically coupled network devices) and setting information of the network devices (e.g., information concerning set filters). Further, in a corporate network, update, extension, and the like of the network are performed frequently. Then, network topology needs to be re-generated at each time. This work causes a heavy load on the network administrators and system engineers.

Next, the second problem will be described below.

Like in the method disclosed in JP 2001-249866 A, when a denial filter is moved intact from a firewall server to an edge node (edge switch), the position of filtering varies. Thus, in some cases, a packet to be forwarded can no longer reach a location which the packet was able to reach before the movement. That is, when a filter is moved, the effect of filtering can vary. Thus, the configuration of the filter needs to be changed such that the effect of filtering should not vary. Nevertheless, in the technology disclosed in JP 2001-249866 A, the filter cannot be moved in such a manner that the effect of filtering does not vary.

The third problem will be described below.

In the technology disclosed in JP 2001-249866 A, a target of load distribution is solely a firewall server. That is, the only allowed movement of a filter is from a firewall server to an edge node. Thus, such a case cannot be treated that the load of an edge node increases and hence filters set in this edge node are desired to be distributed.

Thus, an object of this invention is to solve the above-mentioned three problems.

SUMMARY OF THE INVENTION

The representative aspects of this invention are as follows. That is, there is provided a network system, comprising: a plurality of network devices for forwarding a packet; a network constructed from the plurality of network devices; and a management server coupled to the network and managing the network. The plurality of network devices include a first network device in which a filter assigned as a target of reconfiguration is set and a second network device coupled at a lower level of the first network device. The management server obtains topology of the network from the plurality of network devices; reconfigures, by referring to the obtained network topology, the filter of the first network device and a filter of the second network device such that a range in which a packet can be forwarded through a reconfiguring filter set in the first network device is made equal to a range in which a packet can be forwarded through the filter set in the second network device; and sets the reconfigured filters into the first network device and the second network device.

According to an aspect of this invention, filters are distributed so that the processing load of a network device in which filters are concentrated can be reduced.

BRIEF DESCRIPTION OF THE DRAWINGS

The present invention can be appreciated by the description which follows in conjunction with the following figures, wherein:

FIG. 4 is an explanatory diagram showing a physical topology table in accordance with the first embodiment of this invention;

FIG. 5 is an explanatory diagram showing a filter reconfiguration threshold table in accordance with the first embodiment of this invention;

FIG. 6 is an explanatory diagram showing a filter limit table in accordance with the first embodiment of this invention;

FIG. 7 is an explanatory diagram showing a device type table in accordance with the first embodiment of this invention;

FIG. 8 is an explanatory diagram showing a filter type table in accordance with the first embodiment of this invention;

FIG. 9 is an explanatory diagram showing an example of a user interface provided by an administrator terminal in accordance with the first embodiment of this invention;

FIG. 10 is an explanatory diagram showing a filter entry table of the management server in accordance with the first embodiment of this invention;

FIG. 11 is an explanatory diagram showing a setting history table in accordance with the first embodiment of this invention;

FIG. 13 is an explanatory diagram showing a filter entry table of the network device in accordance with the first embodiment of this invention;

FIG. 14 is an explanatory diagram showing a physical coupling table in accordance with the first embodiment of this invention;

FIG. 15 is an explanatory diagram showing a VLAN setting table in accordance with the first embodiment of this invention;

FIG. 16 is an explanatory diagram showing a routing table in accordance with the first embodiment of this invention;

FIG. 18 is an explanatory diagram showing a message transmitted and received in the filter reconfiguration in accordance with the first embodiment of this invention;

FIG. 23 is an explanatory diagram showing a message transmitted and received in the filter reconfiguration in accordance with the second embodiment of this invention;

FIG. 24 is an explanatory diagram showing an example of a user interface provided by the administrator terminal in accordance with the second embodiment of this invention;

FIG. 26 is an explanatory diagram showing a filter type table of the management server in accordance with the third embodiment of this invention;

FIG. 27 is an explanatory diagram showing a reconfiguration policy table in accordance with the third embodiment of this invention;

FIG. 28 is an explanatory diagram showing an example of a user interface provided by the administrator terminal in accordance with the third embodiment of this invention;

FIG. 29 is an explanatory diagram showing a setting history table in accordance with the third embodiment of this invention;

FIGS. 32A and 32B are sequence diagrams showing filter reconfiguration in accordance with the fourth embodiment of this invention;

FIG. 33 is a diagram describing a message transmitted and received in the filter reconfiguration in accordance with the fourth embodiment of this invention; and FIG. 34 is an explanatory diagram showing an example of a user interface provided by the administrator terminal.

DETAILED DESCRIPTION OF THE PREFERRED EMBODIMENTS

Embodiments of this invention will be described below with reference to the drawings.

First Embodiment

A network system according to a first embodiment of this invention will be described below with reference to FIGS. 1 to 21.

Figure 1:
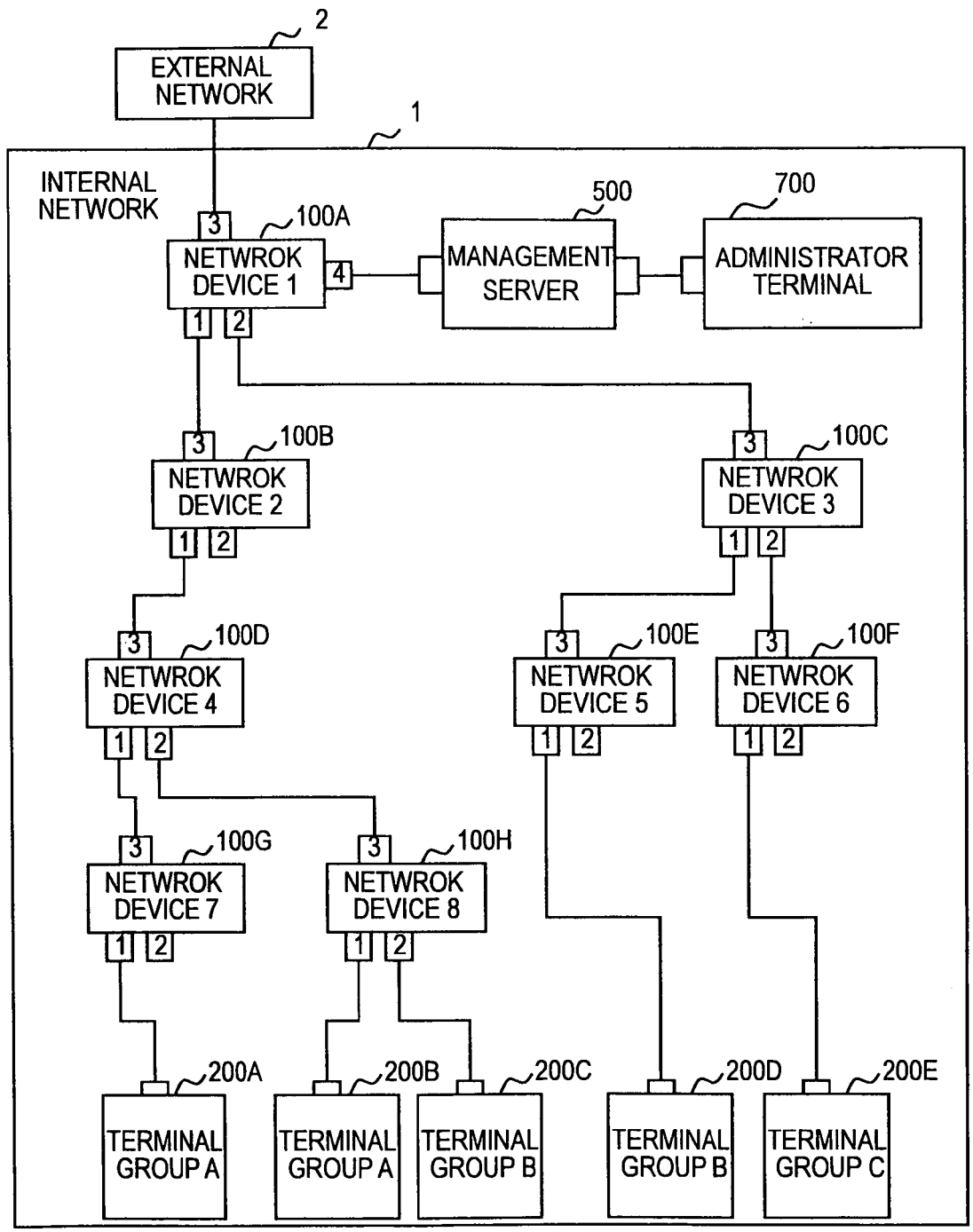
FIG. 1 is an explanatory diagram showing a configuration of a network system in accordance with a first embodiment of this invention.

FIG. 1 is a diagram showing a configuration of a network system according to a first embodiment of this invention.

The network system is constructed from an internal network 1 and an external network 2. The internal network 1 and the external network 2 are coupled to each other.

In the internal network 1, network devices 100A to 100H, terminal groups 200A to 200E, and a management server 500 are coupled. Further, the management server 500 is coupled to an administrator terminal 700. In the following description, the network devices 100A to 100H are generically referred to as a network device 100 in some cases. Further, the terminal groups 200A to 200E are generically referred to as a terminal group 200 in some cases.

The terminal group 200 is a set of computers which are coupled to the network device 100 via a network (e.g., switching hub) and used by users.

In the example shown in FIG. 1, the terminal groups 200A and 200B belong to A Division. The terminal groups 200C and 200D belong to B Division. The terminal group 200E belongs to C Division.

The management server 500 is a computer for managing the internal network 1. The management server 500 will be described later in detail with reference to FIG. 2. The network device 100 is a device for forwarding information to be exchanged in the network to a destination address of the information, and is composed of a switch, a router, a firewall, or the like.

The network device 100 has a plurality of ports. In the example shown in FIG. 1, the network device 100A has ports 1 to 4. Each of the network devices 100B to 100H has ports 1 to 3.

The port 1 of the network device 100A is coupled to the port 3 of the network device 100B. The port 2 of the network device 100A is coupled to the port 3 of the network device 100C. The port 4 of the network device 100A is coupled to the management server 500. The port 3 of the network device 100A is coupled to the external network 2.

The port 1 of the network device 100B is coupled to the port 3 of the network device 100D.

The port 1 of the network device 100C is coupled to the port 3 of the network device 100E. The port 2 of the network device 100C is coupled to the port 3 of the network device 100F.

The port 1 of the network device 100D is coupled to the port 3 of the network device 100G. The port 2 of the network device 100D is coupled to the port 3 of the network device 100H.

The port 1 of the network device 100G is coupled to the terminal group 200A. The port 1 of the network device 100H is coupled to the terminal group 200B. The port 2 of the network device 100H is coupled to the terminal group 200C. The port 1 of the network device 100E is coupled to the terminal group 200D. The port 1 of the network device 100F is coupled to the terminal group 200E.

Figure 2:
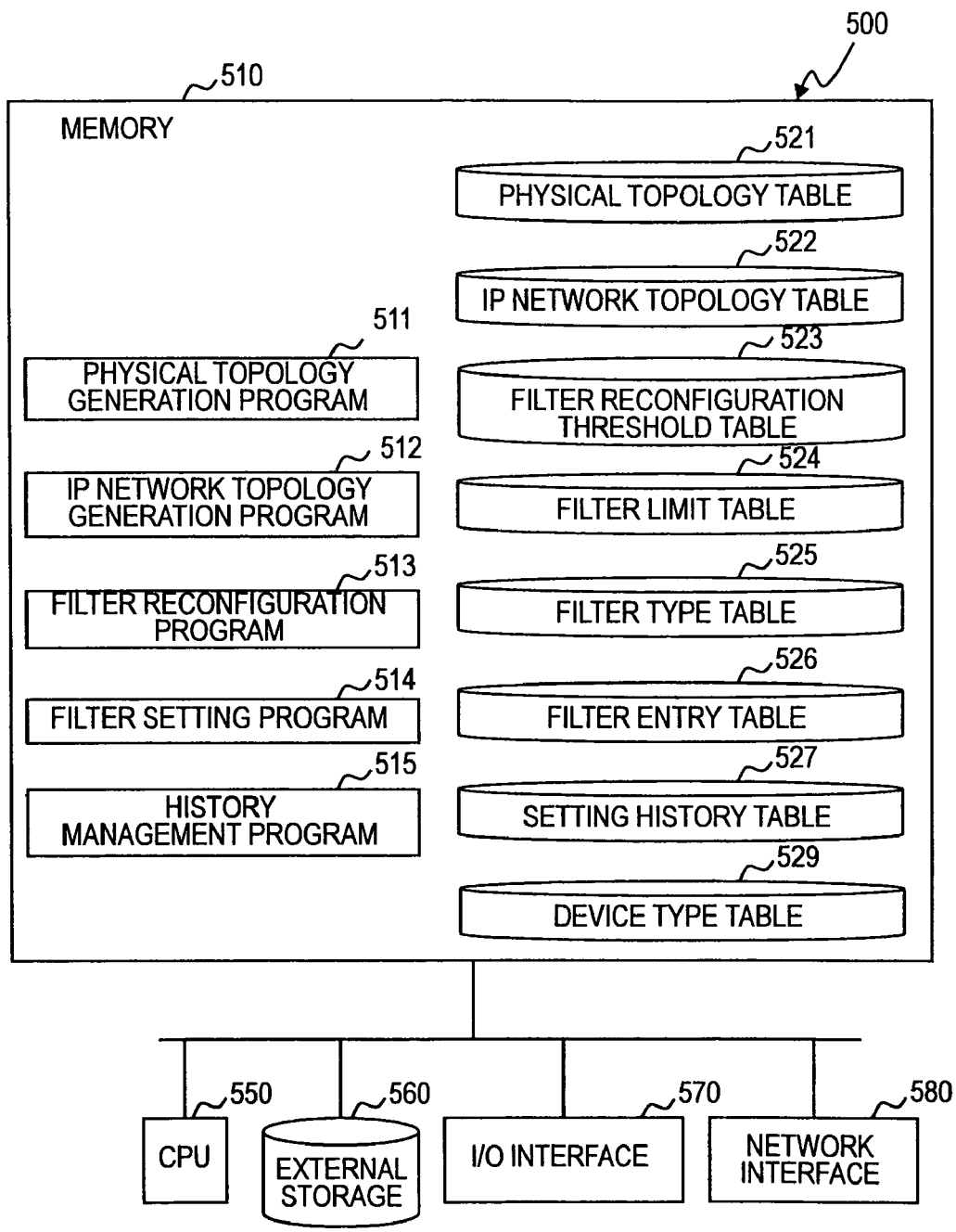
FIG. 2 is a block diagram showing a management server in accordance with the first embodiment of this invention.

FIG. 2 is a block diagram showing the management server 500 according to the first embodiment of this invention.

The management server 500 has a memory 510, a CPU 550, an external storage 560, an I/O interface (I/F) 570, and a network interface (I/F) 580.

The management server 500 is coupled to the network via the network interface 580. Further, the management server 500 transmits and receives information via the network interface 580 to and from other devices and the terminal group 200 coupled to the network.

The memory 510 stores a physical topology generation program 511, an IP network topology generation program 512, a filter reconfiguration program 513, a filter setting program 514, a history management program 515, a physical topology table 521, an IP network topology table 522, a filter reconfiguration threshold table 523, a filter limit table 524, a filter type table 525, a filter entry table 526, a setting history table 527, and a device type table 529.

The physical topology generation program 511 obtained physical coupling information (e.g., information concerning the device adjacent to each network device 100) from the network device 100 constituting the internal network 1, thereby generating the physical topology table 521.

The IP network topology generation program 512 obtained network topology (e.g., VLAN information and route information) from the network device 100 constituting the internal network 1, thereby generating the IP network topology table 522.

The filter reconfiguration program 513 reconfigures the configuration of a filter set in the network device 100. The processing of the filter reconfiguration program 513 will be described later in detail with reference to FIGS. 16 to 20.

The filter setting program 514 reflects the topology of the reconfigured filter into the network device 100.

The history management program 515 saves and recalls the history of reconfiguration of a filter.

The physical topology table 521 is used for managing the physical coupling information that indicates the network device 100 adjacent to each port of the network device 100, the ports of the adjacent network device 100, and the like. The physical topology table 521 will be described later in detail with reference to FIG. 4 presented later.

The IP network topology table 522 is used for managing the logical coupling information between a subnet and a router (e.g., network device 100). The IP network topology table 522 will be described later in detail with reference to FIG. 3.

The filter reconfiguration threshold table 523 is used for managing information concerning the number of reconfiguration target filters which is determined according to the CPU load of the network device 100. The filter reconfiguration threshold table 523 will be described later in detail with reference to FIG. 5.

The filter limit table 524 is used for managing the maximum number of filters that can be set in each device type of the network device 100. The filter limit table 524 will be described later in detail with reference to FIG. 6.

The filter type table 525 is used for managing information necessary for calculating a filter type, a priority selected for a reconfiguration target filter, and the like. The filter type is a feature for grouping the filters, and is determined by a source address, a destination address, a protocol, and the like. The filter type table 525 will be described later in detail with reference to FIG. 8.

The filter entry table 526 is used for managing information concerning the entry of a filter set in the network device 100. The filter entry table 526 will be described later in detail with reference to FIG. 9.

The setting history table 527 is used for managing history of reconfiguration of a filter. The setting history table 527 will be described later in detail with reference to FIG. 10.

The device type table 529 is used for managing information concerning each device type of the network device 100. The device type table 529 will be described later in detail with reference to FIG. 7.

The CPU 550 is a processor for executing each program stored in the memory 510.

The external storage 560 is a device for storing programs and various data, and is constructed, for example, from an HDD.

The I/O interface (I/F) 570 is an interface for inputting and outputting data.

The network interface 580 is an interface for transmitting and receiving information to and from other devices and the terminal group 200 coupled to the network.

Figure 3:
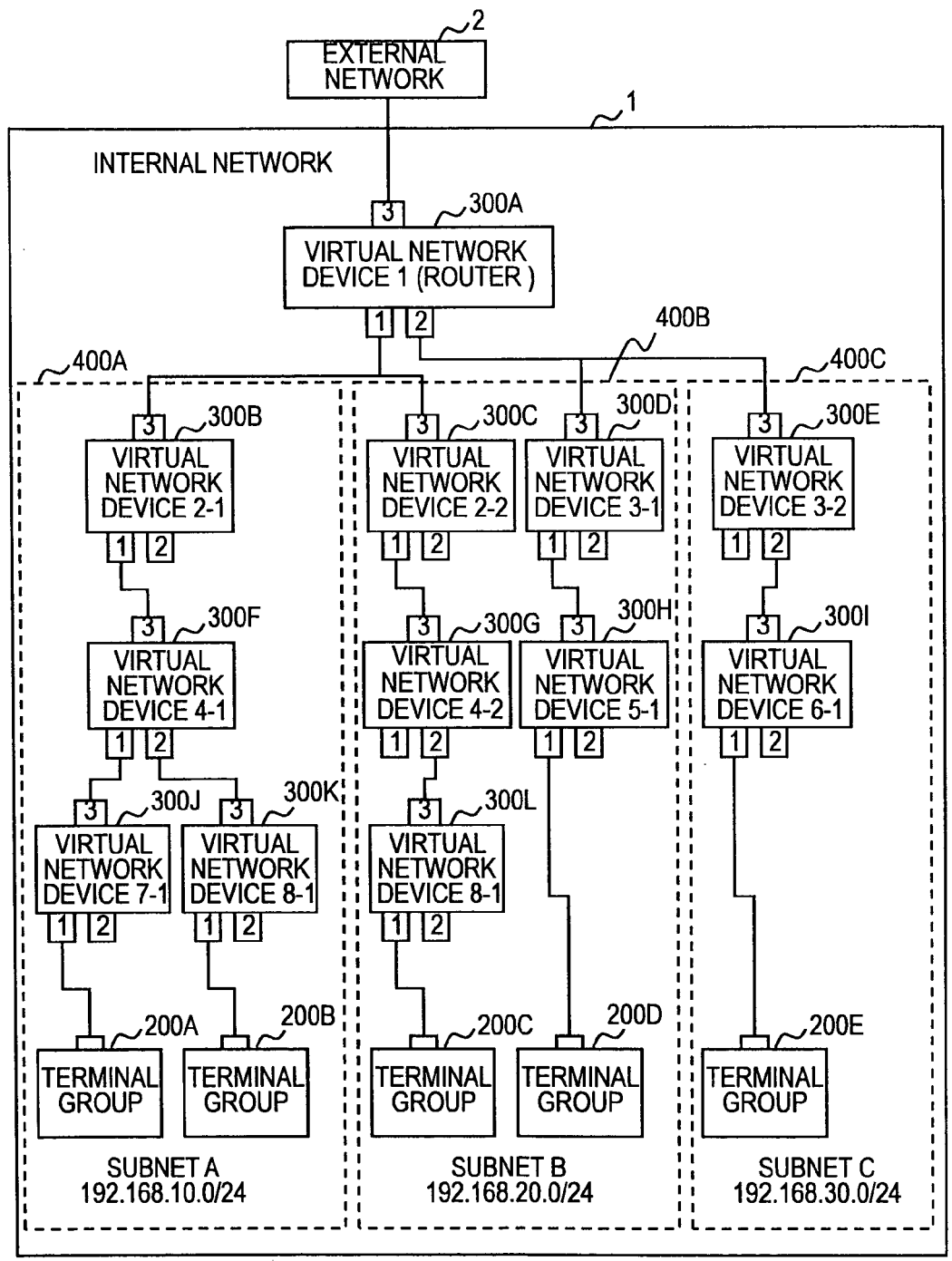
FIG. 3 is an explanatory diagram showing a IP network topology table in accordance with the first embodiment of this invention.

FIG. 3 is an explanatory diagram showing the IP network topology table 522 according to the first embodiment of this invention.

The IP network topology table 522 includes a virtual network device (router) 300A, subnets 400A to 400C, virtual network devices 300B to 300L in the subnets, and the terminal groups 200A to 200E. In the following description, the subnets 400A to 400C are generically referred to as a subnet 400. Further, the virtual network devices 300B to 300L are generically referred to as a virtual network device 300.

The virtual network device (router) 300 is a network device for routing packets.

The subnet 400 is a logical network composed of a VLAN or the like constructed on a physical network.

The IP address range of the subnet 400A is 192.168.10.0/24. The subnet 400A includes the terminal groups 200A and 200B. Further, the subnet 400A includes the virtual network devices 300B, 300F, 300J, and 300K, which corresponds to the network devices 100B, 100D, 100G, and 100H. The virtual network devices 300B, 300F, 300J, and 300K accommodate the terminal groups 200A and 200B.

The IP address range of the subnet 400B is 192.168.20.0/24. The subnet 400B includes the terminal groups 200C and 200D. Further, the subnet 400B includes the virtual network devices 300C, 300D, 300G, 300H, and 300L, which corresponds to the network devices 100B, 100C, 100D, 100E, and 100H. The virtual network devices 300C, 300D, 300G, 300H, and 300L accommodate the terminal groups 200C and 200D.

The IP address range of the subnet 400C is 192.168.30.0/24. The subnet 400C includes the terminal group 200E. Further, the subnet 400C includes the virtual network devices 300E and 300I, which corresponds to the network devices 100C and 100F. The virtual network devices 300E and 300I accommodate the terminal group 200E.

The IP network topology table 522 according to the first embodiment of this invention includes setting information of the VLAN. However, it is sufficient that such information is included that allows the management server 500 to recognize the configuration of devices located at logically lower levels.

FIG. 4 shows the physical topology table 521 according to the first embodiment of this invention.

The physical topology table 521 includes a network device ID 5211, a port ID 5212, an adjacent network device ID 5213, and an adjacent port ID 5214.

The network device ID 5211 is a unique identifier used by the management server 500 for identifying a network device 100.

The port ID 5212 is a unique identifier used by the management server 500 for identifying a port of the network device 100.

The adjacent network device ID 5213 is a unique identifier used by the management server 500 for identifying a network device 100 coupled to the port indicated by the port ID 5212. When a network device 100 to be coupled to the port indicated by the port ID 5212 is not present, no value is stored in the adjacent network device ID 5213.

The adjacent port ID 5214 is a unique identifier used by the management server 500 for identifying a port of the network device 100 coupled to the port indicated by the port ID 5212. When a network device 100 to be coupled to the port indicated by the port ID 5212 is not present, no value is stored in the adjacent port ID 5214.

In the example shown in FIG. 4, the network device ID 5211, the port ID 5212, the adjacent network device ID 5213, and the adjacent port ID 5214 in the second row of the physical topology table 521 are "1", "1", "2", and "3", respectively. This indicates that the port 1 of the network device 1 is coupled to the port 3 of the network device 2.

FIG. 5 shows the filter reconfiguration threshold table 523 according to the first embodiment of this invention.

The filter reconfiguration threshold table 523 includes a CPU load 5231 and a reconfiguration filter number (ratio) 5232.

The CPU load 5231 indicates a range of the load of the CPU of the network device 100.

The reconfiguration filter number (ratio) 5232 indicates a ratio of the number of filters assigned as targets of reconfiguration relative to the maximum number of filters set in the network device 100.

In the example shown in FIG. 5, the CPU load 5231 and the reconfiguration filter number (ratio) 5232 in the first row of the filter reconfiguration threshold table 523 are "90 to 100" and "50", respectively. This indicates that when the CPU load of the network device 100 is 90% to 100%, 50% of the maximum number of filters set in the network device 100 is assigned as reconfiguration target filters.

The filter reconfiguration threshold table 523 is uniformly set for each network device 100 managed by the management server 500. However, setting may be changed according to each network device 100.

FIG. 6 shows the filter limit table 524 according to the first embodiment of this invention.

The filter limit table 524 includes a device type 5241 and a maximum number 5242 of filters.

The device type 5241 indicates a device type of the network device 100.

The maximum number 5242 of filters indicates the maximum number of filters that can be set in the network device 100 of a device type indicated by the device type 5241.

In the example shown in FIG. 6, the device type 5241 and the maximum number 5242 of filters in the first row of the filter limit table 524 are "1" and "1000", respectively. This indicates that 1000 filters can be set in the network device 100 of device type 1.

FIG. 7 shows the device type table 529 according to the first embodiment of this invention.

The device type table 529 includes a network device ID 5291 and a device type 5292.

The network device ID 5291 is a unique identifier used by the management server 500 for identifying a network device 100.

The device type 5292 indicates a device type of the network device 100, which is, for example, the type of the device such as a switch and a router.

In the example shown in FIG. 7, the network device ID 5291 and the device type 5292 in the first row of the device type table 529 are "1" and "1", respectively. This indicates that the network device 1 is of device type 1.

FIG. 8 shows the filter type table 525 according to the first embodiment of this invention.

The filter type table 525 includes a filter type 5251 and a reconfiguring priority 5252.

The filter type 5251 is information used for calculating the filter type. Specifically, this information contains a layer, a source flag, a destination flag, a protocol, a flow direction, and an action of a filter.

The layer indicates information (e.g., L3 (layer 3) and L2 (layer 2)) concerning the layer of a flow targeted by the filter. The source flag indicates information concerning the source address of the flow targeted by the filter. When the filter does not specify the source address, "Any" is described. The destination flag indicates information concerning the destination address of the flow targeted by the filter. When the filter does not specify the destination address, "Any" is described. The protocol indicates information concerning the protocol of the flow targeted by the filter. When the filter does not specify the protocol, "Any" is described. The flow direction indicates the direction (e.g., Egress and Ingress) of the flow targeted by the filter. The action indicates the action of filtering to be performed on the flow targeted by the filter.

A part of information concerning the filter type 5251 need not necessarily be included completely.

The reconfiguring priority 5252 indicates a priority used when each filter type is selected as a reconfiguration target filter. For example, when the reconfiguring priority 5252 has a smaller value, the priority of the filter is higher.

The administrator can issue a request to the management server 500 through the administrator terminal 700 to add and change the entries of the filter type 5251 and the reconfiguring priority 5252. A user interface in the administrator terminal 700 used by the administrator for adding or changing the entries of the filter type 5251 and the reconfiguring priority 5252 is shown in FIG. 9 described later.

In the example shown in FIG. 8, the layer, the source flag, the destination flag, the protocol, the flow direction, and the action of the filter type 5251 and the reconfiguring priority 5252 in the first row of the filter type table 525 are "L3", "Presence", "Presence", the "Specified", "Egress", "Deny", and "1", respectively. This indicates that the filter in the first row of the filter type table 525 is a filter that targets a flow of the layer 3 and sets not to forward a flow of transmitting data having a specified source address, a specified destination address, and a specified protocol to the outside from the network device in which the filter is set, and that this filter is selected as a reconfiguration target filter with the highest priority.

FIG. 9 shows an example of a user interface provided by the administrator terminal 700 for the purpose of inputting a value to be stored into the filter type table 525 shown in FIG. 8.

The user interface screen includes an input field for the filter type 5251 and an input field for the reconfiguring priority 5252. When an "OK" button is operated, a request of adding the filter type 5251 and the reconfiguring priority 5252 is issued to the management server 500. When a value to be to be stored in the filter type table 525 is to be changed, a field for specifying information concerning the filter already set is further included. Then, the filter type 5251 and the reconfiguring priority 5252 to be changed are input for the information concerning the specified filter.

FIG. 10 shows the filter entry table 526 according to the first embodiment of this invention.

The filter entry table 526 includes a network device ID 5261, a port ID 5262, a filter 5263, and a filter applying order 5264.

The network device ID 5261 is a unique identifier for identifying a network device 100.

The port ID 5262 is a unique identifier used for identifying a port in each network device 100.

The filter 5263 indicates contents of the filter set in the port specified by the port ID 5262.

The filter applying order 5264 indicates the order of filters to be applied in each port. For example, a filter having a smaller value has a higher applying order, and hence is applied with priority.

In the example shown in FIG. 10, the network device ID 5261, the port ID 5262, the filter 5263, and the filter applying order 5264 in the first row of the filter entry table 526 are "1", "3", "IP, 192.168.20.0/24, any, SSH, Egress, Deny", and "1", respectively. This indicates that the filter set in the port 3 of the network device 1 targets the layer 3, that the set filter does not forward a flow having a source address of "192.168.20.0/24" and transmitting data using a protocol of SSH to an external network, and that the filter is to be applied with the highest priority.

FIG. 11 shows the setting history table 527 according to the first embodiment of this invention.

The setting history table 527 includes a setting time 5271, a source network device 5272, a source port 5273, a filter 5274, a destination network device 5275, a destination port 5276, and a filter 5277.

The setting time 5271 indicates the time when, after a filter is reconfigured, the reconfigured filter is set into the network device 100.

The source network device 5272 is a unique identifier for identifying a network device 100 of a filter source before the filter reconfiguration.

The source port 5273 is a unique identifier for identifying a port of the network device 100 of a filter source before the filter reconfiguration.

The filter 5274 indicates a filter assigned as a target of reconfiguration before the filter reconfiguration.

The destination network device 5275 is a unique identifier for identifying a network device 100 of a filter destination after the filter reconfiguration.

The destination port 5276 is a unique identifier for identifying a port of the network device 100 of a filter destination after the filter reconfiguration.

The filter 5277 indicates a filter after the reconfiguration.

In the example shown in FIG. 11, the setting time 5271, the source network device 5272, the source port 5273, the filter 5274, the destination network device 5275, the destination port 5276, and the filter 5277 in the first row of the setting history table 527 are "2007-07-07 10:12:59", "1", "3", "IP, 192.168.20.0/24, any, SSH, Egress, Deny", "2", "3", and "(IP, 192.168.20.0/24, 192.168.10.0/24, SSH, Egress, Permit) (IP, 192.168.20.0/24, 192.168.30.0/24, SSH, Egress, Permit) (IP, 192.168.20.0/24, 192.168.20.0/24, SSH, Egress, Permit) (IP, 192.168.20.0/24, any, SSH, Egress, Deny", respectively. This indicates that a filter is set at 10:12:59 on Jul. 7, 2007 and that the filter (IP, 192.168.20.0/24, any, SSH, Egress, Deny) set in the port 3 of the network device 1 is reconfigured so that a filter ((IP, 192.168.20.0/24, 192.168.10.0/24, SSH, Egress, Permit), (IP, 192.168.20.0/24, 192.168.30.0/24, SSH, Egress, Permit), (IP, 192.168.20.0/24, 192.168.20.0/24, SSH, Egress, Permit), (IP, 192.168.20.0/24, any, SSH, Egress, Deny)) is set into the port 3 of the network device 2.

Figure 12:
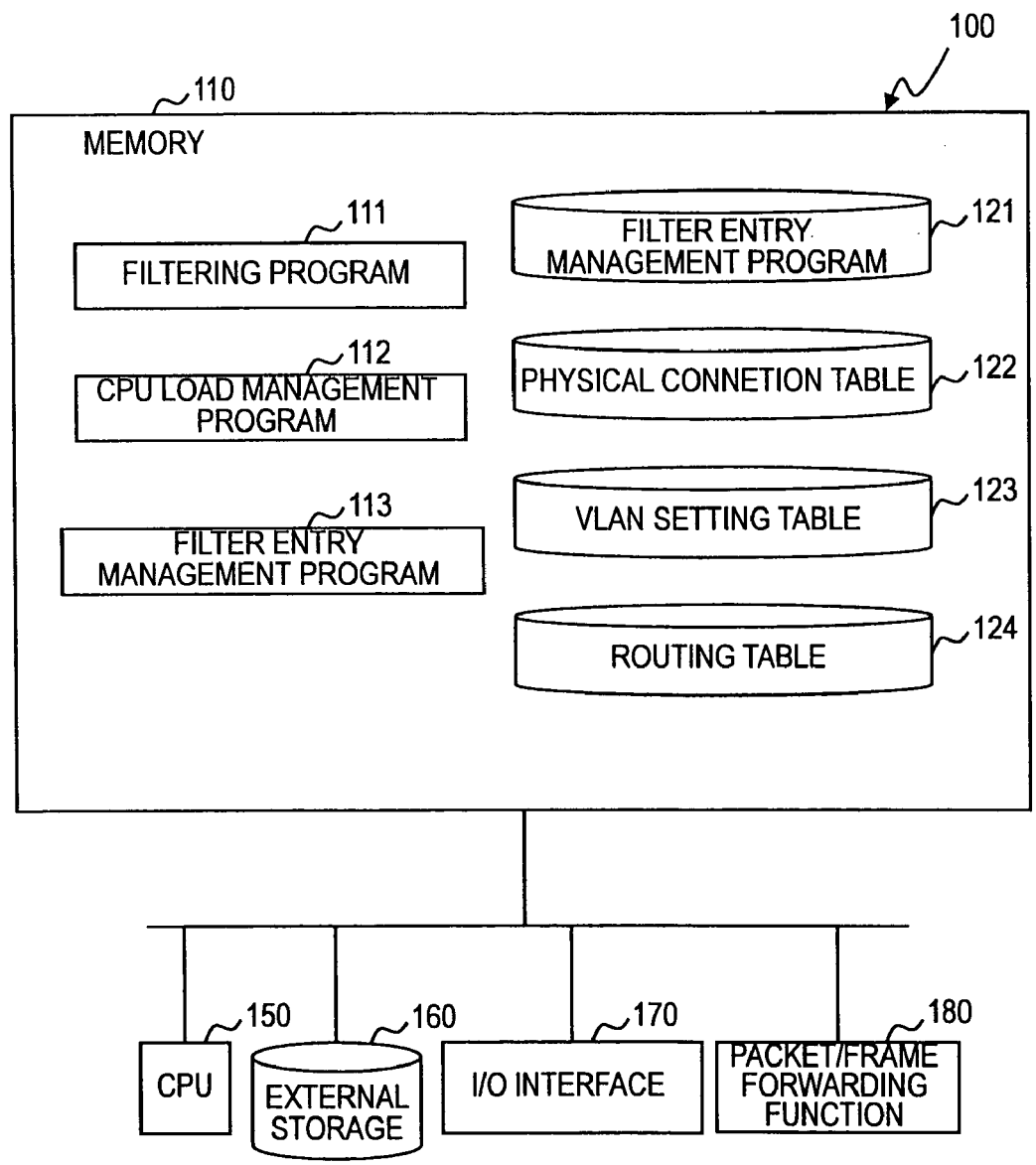
FIG. 12 is a block diagram showing a network device in accordance with the first embodiment of this invention.

FIG. 12 is a block diagram of the network device 100 according to the first embodiment of this invention.

The network device 100 has a memory 110, a CPU 150, an external storage 160, an I/O interface (I/F) 170, and a packet/frame forwarding function section 180.

The memory 110 stores a filtering program 111, a CPU load management program 112, a filter entry management program 113, a filter entry table 121, a physical coupling table 122, a VLAN setting table 123, and a routing table 124.

The filtering program 111 performs, based on the information stored in the filter entry table 121, filtering on the packets and frames received through the packet/frame forwarding function section 180.

The CPU load management program 112 manages the load of the CPU 150. Further, when load information of the CPU is requested from the management server 500, the CPU load management program 112 notifies the load information of the CPU to the management server 500.

The filter entry management program 113 manages the filter entry table 121. Further, according to the setting of a filter entry requested from the management server 500, the filter entry management program 113 stores a value into the filter entry table 121.

The filter entry table 121 is used for managing the filter entries. The filter entry table 121 will be described later in detail with reference to FIG. 13.

The physical coupling table 122 is used for managing physical coupling information between a network device 100 and an adjacent network device 100 thereto. The physical coupling table 122 will be described later in detail with reference to FIG. 14.

The VLAN setting table 123 is used for managing information concerning the VLAN set in the network device 100. The VLAN setting table 123 will be described later in detail with reference to FIG. 15.

The routing table 124 is used for managing route information set in the network device 100. The routing table 124 will be described later in detail with reference to FIG. 16.

The CPU 150 is a processor for executing each program stored in the memory 110.

The external storage 160 is a device for storing programs and various data, and is constructed, for example, from an HDD.

The I/O interface 170 is an interface for inputting and outputting data.

The packet/frame forwarding function section 180 is an interface for transmitting and receiving packets and frames to and from other network devices 100 and terminal groups 200.

FIGS. 13 to 16 are diagrams describing information held by the network device 100. FIGS. 13 to 16 shows an example of information held by the network device 100A.

FIG. 13 shows the filter entry table 121 according to the first embodiment of this invention.

The filter entry table 121 includes a port 1211, a layer 1212, a source address 1213, a destination address 1214, a protocol 1215, a flow direction 1216, an action 1217, and a filter applying order 1218.

The port 1211 is a unique identifier for identifying a port where the filter is set.

The layer 1212 indicates information (e.g., L3 (layer 3) and L2 (layer 2)) concerning the layer of a flow targeted by the filter.

The source address 1213 indicates information concerning the source address of the flow targeted by the filter. When the filter does not specify the source address, "Any" is described.

The destination address 1214 indicates information concerning the destination address of the flow targeted by the filter. When the filter does not specify the destination address, "Any" is described.

The protocol 1215 indicates information concerning a protocol of the flow targeted by the filter. When the filter does not specify the protocol, "Any" is described.

The flow direction 1216 indicates the direction (e.g., Egress or Ingress) of the flow targeted by the filter.

The action 1217 indicates the action of filtering to be performed on the flow targeted by the filter.

The filter applying order 1218 indicates the order of filters to be applied in each port. For example, a filter having a smaller value has a higher applying order, and hence is applied with priority.

In the example shown in FIG. 13, the port 1211, the layer 1212, the source address 1213, the destination address 1214, the protocol 1215, the flow direction 1216, the action 1217, and the filter applying order 1218 in the first row of the filter entry table 121 are "3", "L3", "192.168.10.0/24", "Any", "SSH", "Egress", "Deny", and "1", respectively. This indicates that the filter set in the port 3 of the network device 100A targets the layer 3, that the set filter does not forward a flow having a source address of "192.168.10.0/24" and transmitting data using a protocol of SSH to an external network, and that the filter is to be applied with the highest priority.

FIG. 14 shows the physical coupling table 122 according to the first embodiment of this invention.

The physical coupling table 122 includes a port ID 1221, an adjacent network device ID 1222, and an adjacent port ID 1223.

The port ID 1221 is a unique identifier for identifying a port.

The adjacent network device ID 1222 is a unique identifier for identifying a network device 100 adjacent to each port.

The adjacent port ID 1223 is a unique identifier for identifying a port of the network device 100 coupled to the port indicated by the port ID 1221.

In the example shown in FIG. 14, the port ID 1221, the adjacent network device ID 1222, and the adjacent port ID 1223 in the second row of the physical coupling table 122 are "1", "2", and "3", respectively. This indicates that the port 1 of the network device 100A is coupled to the port 3 of the network device 2.

FIG. 15 shows the VLAN setting table 123 according to the first embodiment of this invention.

The VLAN setting table 123 includes a VLAN ID 1231 and a VLAN assigned port 1232.

The VLAN ID 1231 is an identifier for identifying a set VLAN.

The VLAN assigned port 1232 is a unique identifier for identifying a port of the network device 100 in which the VLAN is set.

In the example shown in FIG. 15, the VLAN ID 1231 and the VLAN assigned port 1232 in the first row of the VLAN setting table 123 are "10" and "1", respectively. This indicates that a "VLAN10" is set in the port 1 of the network device 100A.

FIG. 16 shows the routing table 124 according to the first embodiment of this invention.

The routing table 124 includes a destination address 1241 and an interface 1242.

The destination address 1241 indicates a range of the IP address of the network that can serve as a destination address.

The interface 1242 indicates an interface for transmitting a packet to the destination address indicated by the destination address 1241. The interface is a physical interface (port) or alternatively a virtual interface set by VLAN.

In the example shown in FIG. 16, the destination address 1241 and the interface 1242 in the first row of the routing table 124 are "192.168.10.0/24" and "VLAN interface 10", respectively. This indicates that the interface for transmitting data to the destination address "192.168.10.0/24" is a "VLAN interface 10".

Figure 17A:
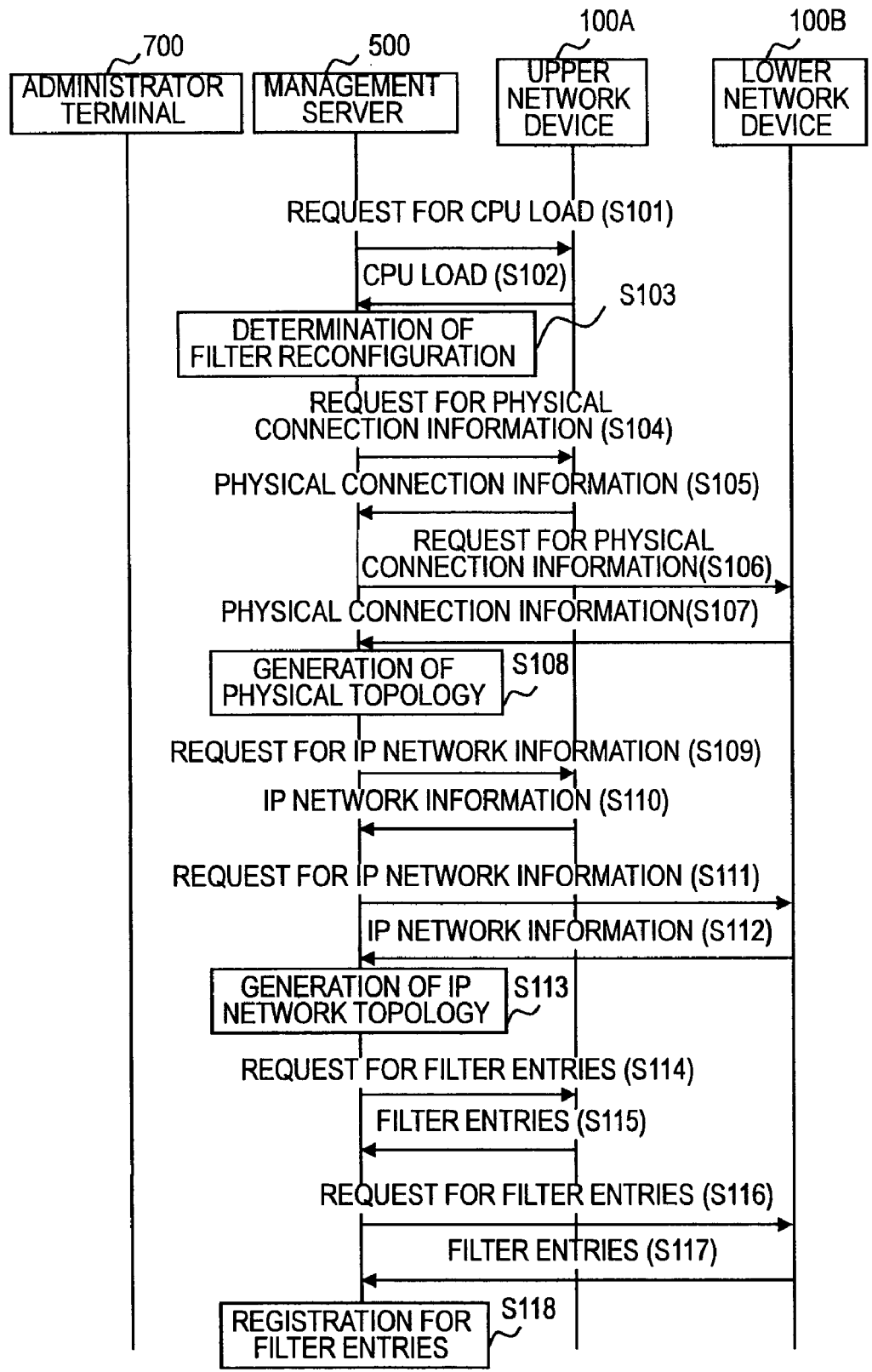
FIGS. 17A and 17B are sequence diagrams showing filter reconfiguration in accordance with the first embodiment of this invention.
Figure 17B:
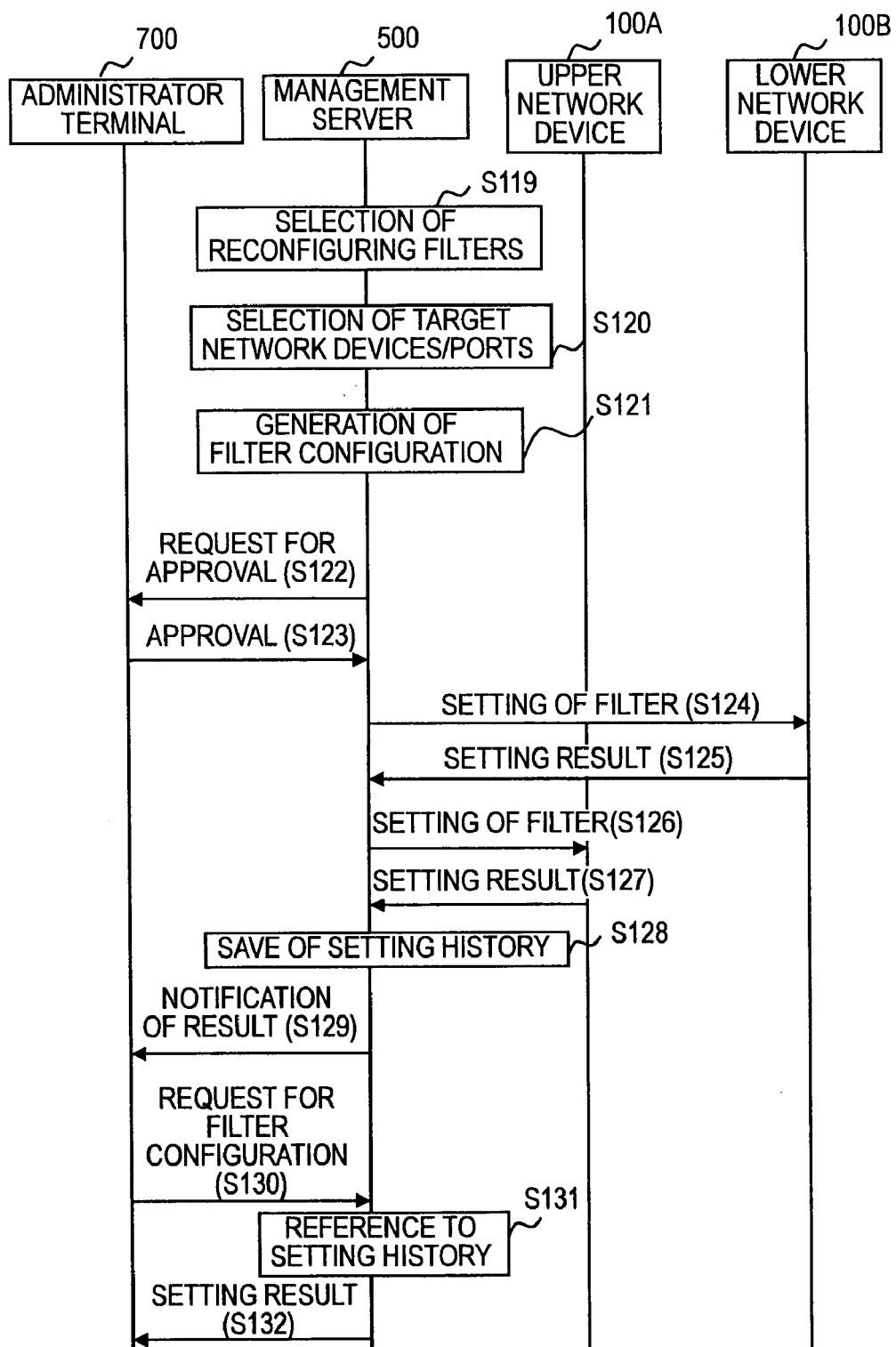

FIGS. 17A and 17B are sequence diagrams showing filter reconfiguration according to the first embodiment of this invention.

FIG. 18 is a diagram showing a message transmitted and received in the filter reconfiguration according to the first embodiment of this invention.

In the example shown in FIGS. 17A and 17B, a filter set in the port 3 of the upper network device 100A is moved (distributed) to the lower network devices 100B and 100C. In the example shown in FIGS. 17A and 17B, the network device 100B is treated as the lower network device as a representative of the network devices 100B to 100H.

First, the management server 500 periodically requests the load information of the CPU of the upper network device 100A (S101).

Then, the upper network device 100A having received the request from the management server 500 notifies the load information of the CPU to the management server 500 by using a message (CPU load) shown in FIG. 18 (S102).

In Step S101, the management server 500 requests the load information of the CPU only for the upper network device 100A. However, the load information of the CPU may be requested also for the lower network device in order to check whether the CPU has vacancy.

Then, based on the CPU load notified in Step S102, the management server 500 determines whether reconfiguration of the filter is necessary (S103). Specifically, the management server 500 refers to the filter reconfiguration threshold table 523. Then, when the CPU load notified in Step 102 is in the range of the CPU load 5231 in the filter reconfiguration threshold table 523, it is determined that reconfiguration of the filter is necessary. Thus, based on the reconfiguration filter number (ratio) 5232, the number of filters assigned as targets of reconfiguration is calculated.

Then, the management server 500 requests physical coupling information from the upper network device 100A and the lower network device 100B (S104 and S106).

Then, the upper network device 100A and the lower network device 100B having received the request from the management server 500 use a message (physical coupling information) shown in FIG. 18 to notify to the management server 500 the information stored in the physical coupling table 122 (S105 and S107).

Then, based on the information stored in the physical coupling table 122 and notified in Steps S105 and S107, the management server 500 updates the physical topology table 521 (S108).

Then, the management server 500 requests IP network information of the upper network device 100A and the lower network device 100B (S109 and S111).

Then, the upper network device 100A and the lower network device 100B having received the request from the management server 500 use a message (IP network information) shown in FIG. 18 to notify to the management server 500 the information stored in the VLAN setting table 123 and the routing table 124 (S110 and S112).

Then, based on the information notified in Steps S110 and S112, the management server 500 updates the IP network topology table 522 (S113).

The management server 500 requests information concerning the filter entries of the upper network device 100A and the lower network device 100B (S114 and S116).

Then, the upper network device 100A and the lower network device 100B having received the request from the management server 500 use a message (filter entry) shown in FIG. 18 to notify to the management server 500 the information stored in the filter entry table 121 (S115 and S117).

Then, the management server 500 registers into the filter entry table 526 the information notified in Steps S115 and S117 (S118). When the same entry is already registered in the filter entry table 526, the management server 500 updates the registered information concerning the filter entries by using the information notified in Steps S115 and S117.

Then, the management server 500 selects a filter assigned as a target of reconfiguration (S119). The reconfiguration target filter selection of selecting a filter assigned as a target of reconfiguration will be described later in detail with reference to FIG. 19.

Then, the management server 500 selects a network device 100 (target network device) and a port serving as a target of filter reconfiguration (S120). The selection of target network devices/ports of selecting a network device and a port serving as targets will be described later in detail with reference to FIG. 20.

Then, the management server 500 generates the configuration of a new filter (S121). The generation of filter configuration for generating the configuration of a new filter will be described later in detail with reference to FIG. 21.

Then, using a message (approval request) shown in FIG. 18, the management server 500 notifies the configuration of the filter generated in Step S121 to the administrator terminal 700 to request approval of reflecting the configuration of the new filter into the network device 100 (S122).

Then, the administrator terminal 700 checks the configuration of the filter notified in Step S122. Then, when it is to be reflected into the network device 100, approval is issued (S123).

Then, using a message (filter setting) shown in FIG. 18, the management server 500 notifies a filter entry to the upper network device 100A and the lower network device 100B such that the effect of the filter to be reconfigured should not be stopped temporarily, and thereby sets the filter (S124 and S126). Specifically, the management server 500 changes the configuration of the filters of the upper network device 100A and the lower network device 100B into the configuration of the new filter generated in Step S121.

Then, the upper network device 100A and the lower network device 100B notify to the management server 500 the setting result of the filter set in Steps S124 and S126 (S125 and S127).

Then, the management server 500 registers into the setting history table 527 the contents of the filter set in Steps S124 and S126 (S128). Into the setting time 5271 in the setting history table 527, the time is registered that setting is performed into the network device (upper network device 100A or lower network device 100B) 100.

Then, the management server 500 notifies the setting result to the administrator terminal 700 (S129).

Then, using a message (filter configuration request) shown in FIG. 18, the administrator terminal 700 specifies the time that acquisition of information concerning the configuration of the filter is desired, and requests to the management server 500 the information concerning the configuration of the filter (S130).

Then, the management server 500 refers to the setting history table 527 (S131). Then, using a message (filter configuration setting result) shown in FIG. 18, the management server 500 notifies to the administrator terminal 700 the network topology at the time requested from the administrator terminal 700 (S131).

Figure 19:
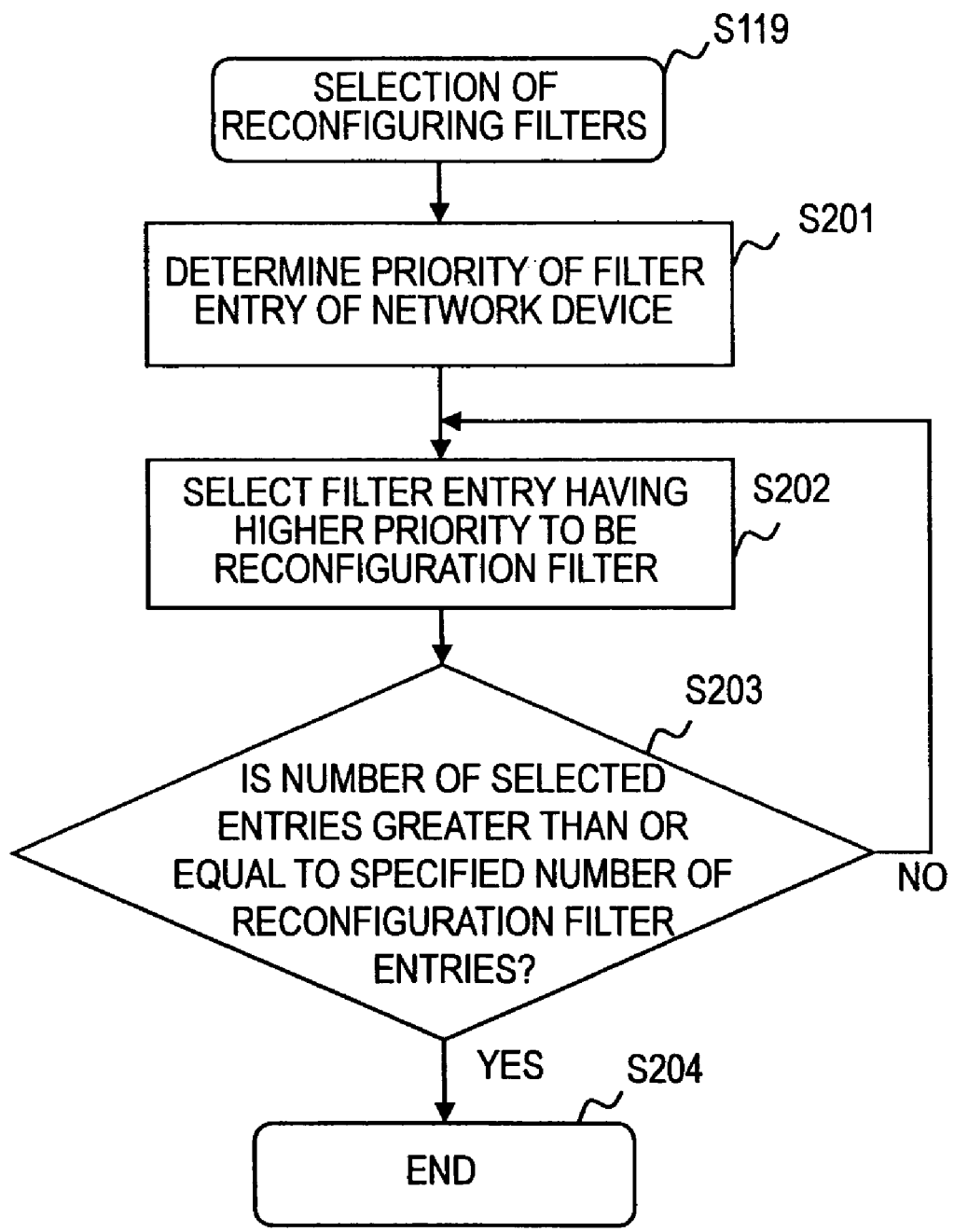
FIG. 19 is a flow chart showing a selection of a reconfiguring filters in accordance with the first embodiment of this invention.

FIG. 19 is a flow chart of the selection of the reconfiguring filters according to the first embodiment of this invention.

After registering the information into the filter entry table 526 in the processing in Step S118 of FIG. 17A, the management server 500 executes the selection of the reconfiguring filters.

First, using the filter type table 525, the management server 500 determines the priority of the filter of the network device 100 in which a filter of reconfiguration target is set (S201).

Then, with reference to the priority determined in Step S201, the management server 500 selects as a reconfiguring filter a filter entry having a higher priority (S202). When no value is stored in the priority, the entry is not selected as a reconfiguring filter.

Then, the management server 500 determines whether entries have been selected in a number greater than or equal to the number of reconfiguring filters calculated in Step S103 of FIG. 17A (S203).

When entries in a number greater than or equal to the number of reconfiguring filters are not yet selected, the procedure returns to the processing in Step S202. In contrast, when entries in a number greater than or equal to the number of reconfiguring filters have been selected, the filters defined by the selected entries are assigned to be reconfiguring filters, and then the selection of the reconfiguring filters is terminated (S204).

Figure 20:
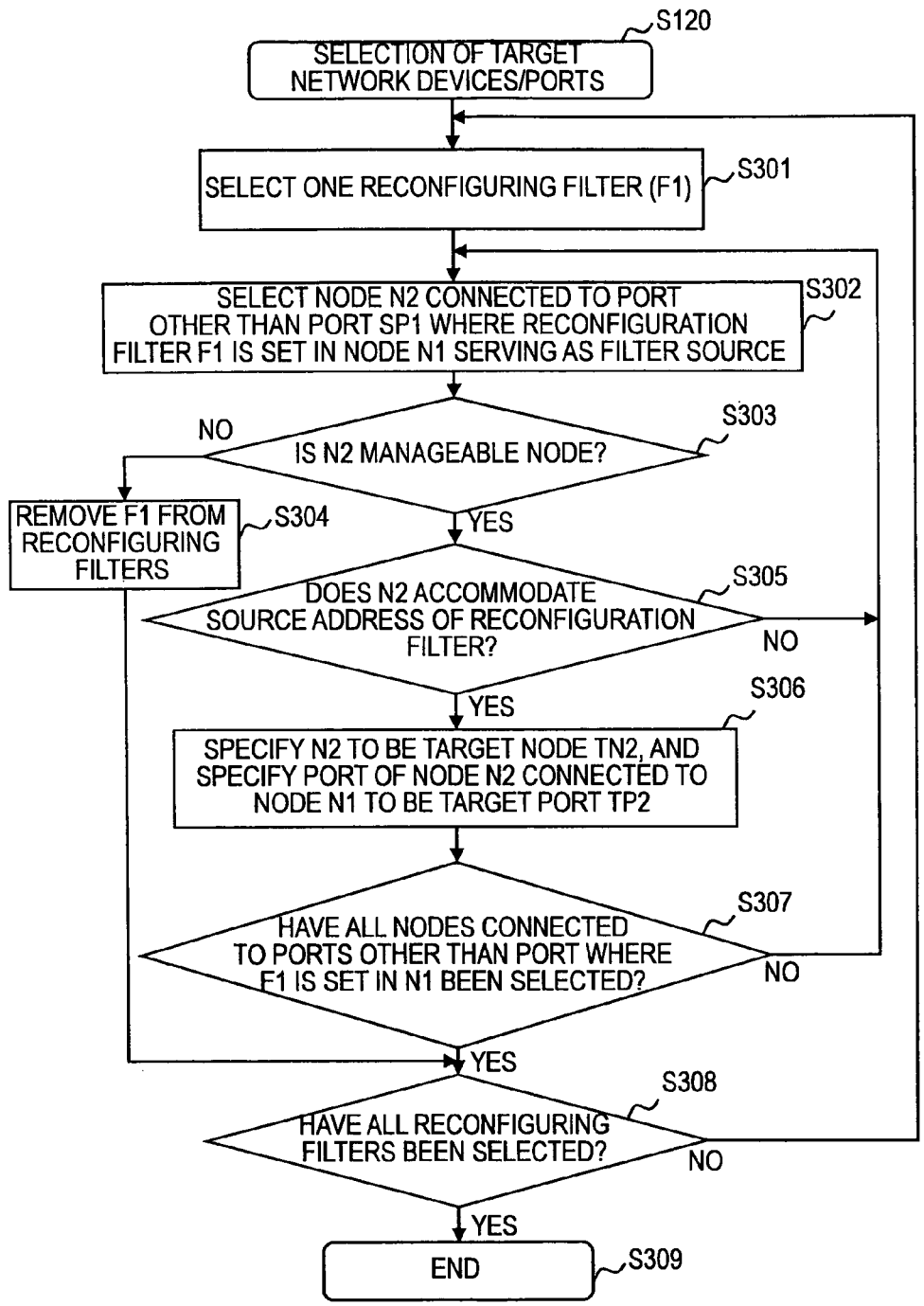
FIG. 20 is a flow chart showing a selection of target network devices/ports in accordance with the first embodiment of this invention.

FIG. 20 is a flow chart of the selection of target network devices/ports according to the first embodiment of this invention.

After selecting a reconfiguring filter in the processing in Step S119 of FIG. 17B, the management server 500 executes the selection of target network devices/ports.

First, the management server 500 selects one reconfiguring filter (F1) (S301).

Then, the management server 500 selects a node N2 coupled to a port other than a port SP1 where the reconfiguring filter F1 is set in the node (e.g., network device 100) N1 serving as a filter source (S302).

Then, the management server 500 determines whether the node N2 is a manageable node (S303). For example, the network device 100 constituting the internal network 1 is a manageable node.

When the node N2 is a manageable node, the procedure goes to Step S305. In contrast, when the node N2 is not a manageable node, the filter cannot be distributed to the node N2. Thus, the procedure goes to Step S304.

In Step S304, the management server 500 removes the reconfiguring filter F1 from the reconfiguring filters (S304). Then, the procedure goes to the processing in Step S308.

The management server 500 executes the processing on the remaining reconfiguring filters other than the filter entry removed in Step S304.

Further, in the selection of the reconfiguring filters shown in FIG. 19, the management server 500 may newly add reconfiguring filters in a number equal to the number of reconfiguring filters removed in Step S304, and may then execute the processing.

Then, the management server 500 determines whether the node N2 accommodates a source address specified by the reconfiguring filter (S305).

When the node N2 does not accommodate the source address, the procedure returns to the processing in Step S302. In contrast, when the node N2 accommodates the source address, the node N2 is set to be a target node TN2. Further, a port of the node N2 coupled to the node N1 is specified to be a target port TP2 (S306).

Then, the management server 500 determines whether all nodes coupled to the ports other than the port where the reconfiguring filter F1 is set among the ports of the node N1 have been selected (S307). When all nodes are not yet selected, the procedure returns to the processing in Step S303. In contrast, when all nodes have been selected, the procedure goes to the processing in Step S308.

Then, the management server 500 determines whether all reconfiguring filters have been selected (S308). When all reconfiguring filters are not yet selected, the procedure returns to the processing in Step S301. In contrast, when all reconfiguring filters have been selected, the selection of target network devices/ports is terminated (S309).

Figure 21:
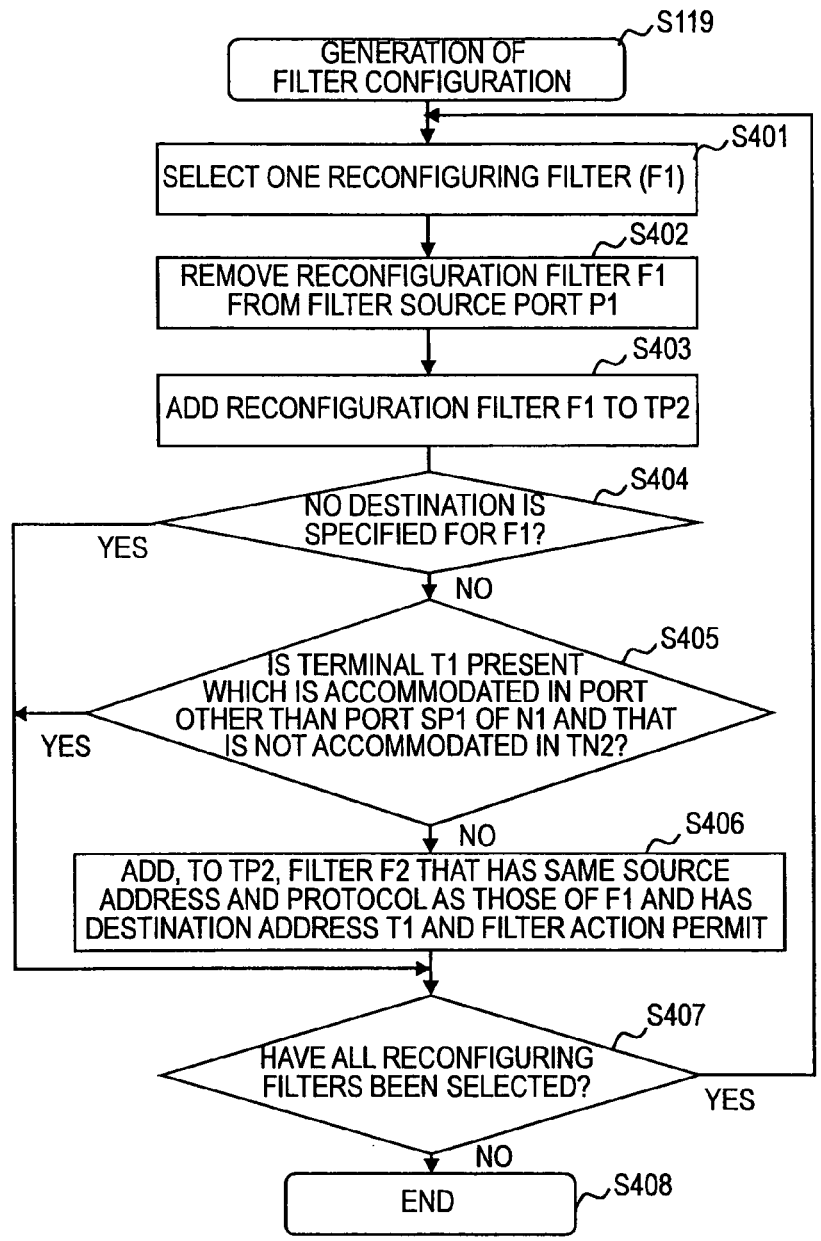
FIG. 21 is a flow chart showing a generation of filter configuration in accordance with the first embodiment of this invention.

FIG. 21 shows a flow chart of the generation of filter configuration according to the first embodiment of this invention.

After selecting a target network device and a target port in the processing in Step S120 of FIG. 17B, the management server 500 executes the generation of filter configuration.

First, the management server 500 selects one reconfiguring filter (F1) (S401).

Then, the management server 500 deletes the reconfiguring filter F1 selected in Step S401, from the port P1 serving as a filter source (S402).

Then, the management server 500 adds the reconfiguring filter F1 to the target port TP2 specified in Step S306 of FIG. 20 (S403).

Then, the management server 500 determines whether a destination address of the reconfiguring filter F1 is specified (S404). When a destination address of the reconfiguring filter F1 is not specified, a new filter need be added to the target port TP2 in order that the configuration of the filter should have a filtering effect equivalent to the filtering effect of the reconfiguring filter F1. Thus, the procedure goes to the processing in Step S405. In contrast, when a destination address of the reconfiguring filter F1 is specified, a new filter need not be added. Thus, the procedure goes to the processing in Step S407.

The above-mentioned statement that the configuration of a filter has an equivalent filtering effect indicates that when a filter set in a node N1 serving as a filter source is newly set in a target node TN2, the range in which packets are forwarded is equal to the range in which packets were forwarded before the newly setting of the filter.

Then, the management server 500 determines the presence of a terminal T1 that is accommodated in a port other than the port SP1 of the network device N1 serving as a filter source and that is not accommodated in the TN2 (S405).

When a terminal T1 is present that is accommodated in a port other than the port SP1 of the network device N1 serving as a filter source and that is not accommodated in the TN2, in order that the configuration of the filter should have the same effect as the effect before the reconfiguration, the management server 500 adds to the "TP2" a filter F2 that has the same source address and protocol as those of the "F1" and has a destination address "T1" and a filter action "Permit" (S406). The destination address may be specified by the IP address of "T1", by the MAC Address, or by a form where the IP address is summarized. In contrast, when a terminal T1 is not present that is accommodated in a port other than the port SP1 of the network device N1 serving as a filter source and that is not accommodated in the TN2, the procedure goes to Step S407.

Then, the management server 500 determines whether all reconfiguring filters have been selected (S407).

When all reconfiguring filters are not yet selected, the procedure returns to the processing in Step S401. In contrast, when all reconfiguring filters have been selected, the generation of filter configuration is terminated (S408).

As such, according to the first embodiment of this invention, a management server automatically obtains information necessary for distributing filters. This reduces the work cost of network administrators and system engineers. Further, using network topology obtained from network devices, filters can be distributed to necessary locations. Further, when filters are distributed, the filters can be constructed such that the effect of filtering should not vary.

Second Embodiment

A network system according to a second embodiment of this invention will be described below with reference to FIGS. 22 and 23.

The second embodiment is characterized in that when an administrator terminal 700 requests reconfiguration of a filter to a management server 500, the management server 500 having received the request reconfigures the filter.

Figure 22:
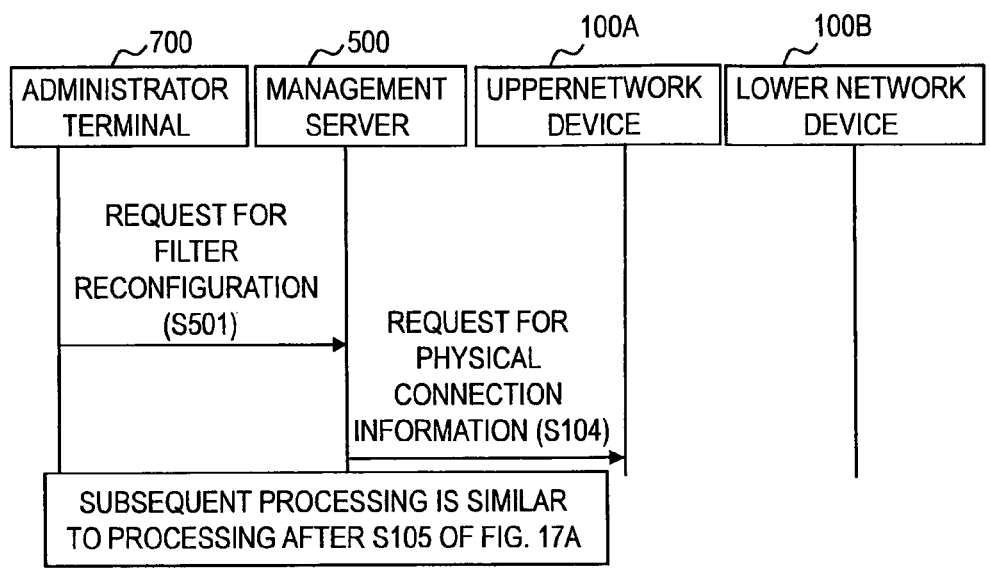
FIG. 22 is a sequence diagram showing filter reconfiguration in accordance with a second embodiment of this invention.

FIG. 22 is a sequence diagram showing filter reconfiguration according to the second embodiment of this invention. FIG. 23 is a diagram describing a message transmitted and received in the filter reconfiguration according to the second embodiment of this invention.

First, using a message (filter reconfiguration request) shown in FIG. 23, the administrator terminal 700 specifies a target network device 100 and the number of reconfigured filters, and requests filter reconfiguration to the management server 500 (S501).

A user interface in the administrator terminal 700 used by the administrator for specifying a target network device 100 and the number of reconfigured filters is shown in FIG. 24 described later.

Then, the management server 500 requests physical coupling information from the upper network device 100A and the lower network device 100B (S104). The subsequent processing is the same as that in Step S105 and the subsequent steps of FIG. 17A. Thus, its description is omitted.

FIG. 24 shows an example of a user interface provided by the administrator terminal 700 for specifying a target network device 100 and the number of reconfigured filters.

The user interface includes an input field for a target network device 100, an input field for a port of the target network device 100, and an input field for the number of reconfigured filters. When an "OK" button is operated, a filter reconfiguration request that specifies the target network device 100 and the number of reconfigured filters is issued to the management server 500.

As such, according to the second embodiment of this invention, an arbitrary network device 100 can be specified as a distribution source of a filter.

Third Embodiment

A network system according to a third embodiment of this invention will be described below with reference to FIGS. 25 to 28.

The third embodiment is characterized in that, in the first embodiment, reconfiguration (referred to as single reconfiguration, hereinafter) in which a filter is moved to a network device 100 (e.g., network device 100B) adjacent to a network device 100 (e.g., network device 100A) serving as a filter source is repeated so that the filter is moved to a network device 100 located at a lower level of the adjacent network device 100 (referred to as recursive reconfiguration, hereinafter).

Further, a range in which the filter is moved is defined as a reconfiguration policy. Then, the reconfiguration policy is specified for each filter type.

Figure 25:
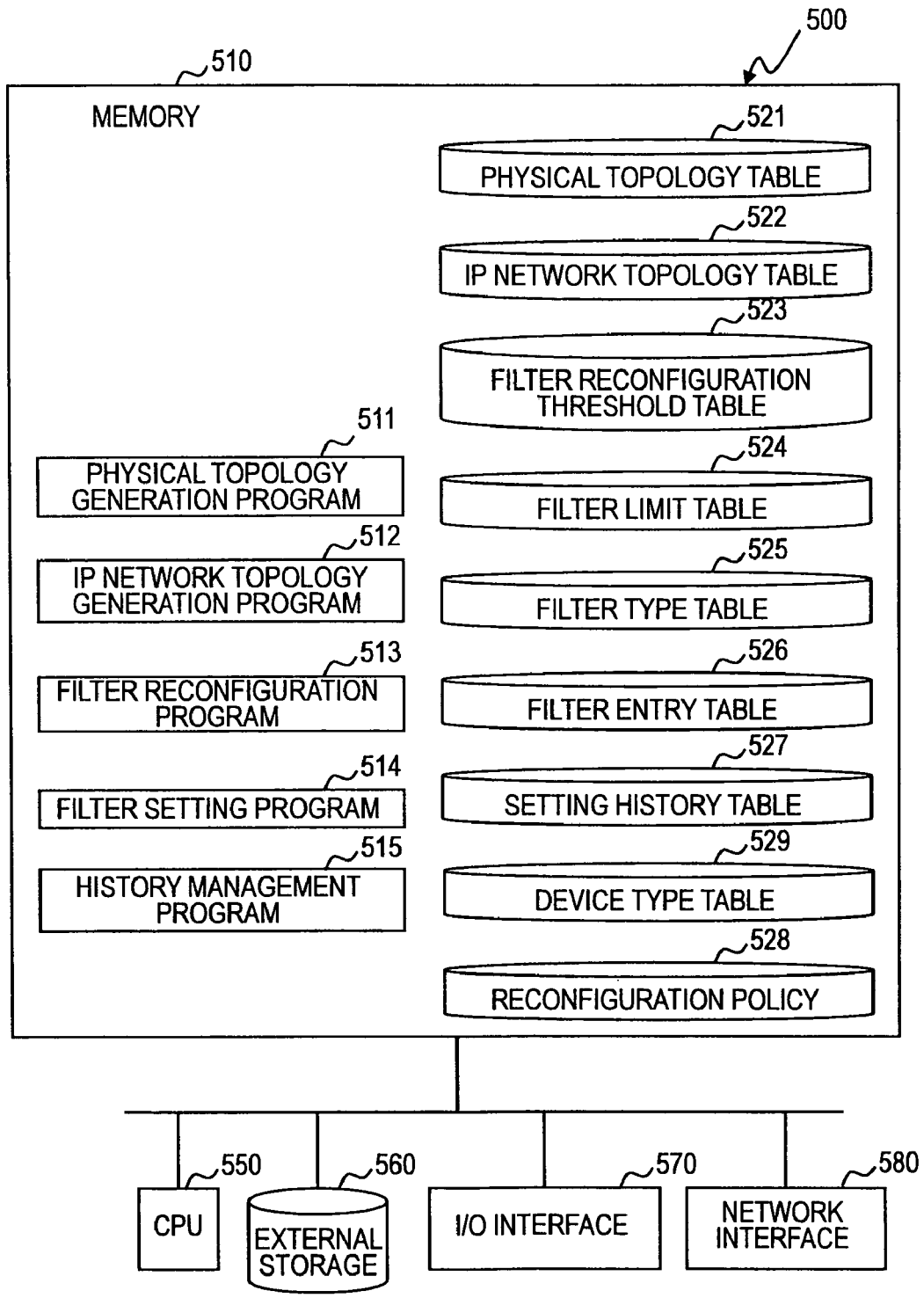
FIG. 25 is a block diagram showing a management server in accordance with a third embodiment of this invention.

FIG. 25 is a block diagram showing the management server 500 according to the third embodiment of this invention.

The difference from the management server 500 according to the first embodiment is that information managed using the filter type table 525 is extended and that a reconfiguration policy table 528 is added.

The filter type table 525 according to the third embodiment will be described later in detail with reference to FIG. 26.

The reconfiguration policy table 528 is used for managing the reconfiguration policy that defines the range in which the filter is moved. The reconfiguration policy table 528 will be described later in detail with reference to FIG. 27 presented later.

FIG. 26 shows the filter type table 525 according to the third embodiment of this invention.

The filter type table 525 according to the third embodiment has a difference from the filter type table 525 according to the first embodiment in that a reconfiguration policy ID 5253 is included.

The reconfiguration policy ID 5253 is an ID used for identifying a policy adopted in reconfiguring.

Using the reconfiguration policy ID 5253, the management server 500 refers to the reconfiguration policy table 528 described later so as to obtained the contents of a reconfiguration policy corresponding to each reconfiguration policy ID 5253.

The administrator can issue a request to the management server 500 through the administrator terminal 700 so as to add or change the filter type 5251, the reconfiguring priority 5252, and the reconfiguration policy ID 5253. A user interface in the administrator terminal 700 used by the administrator for adding or changing the filter type 5251, the reconfiguring priority 5252, and the reconfiguration policy ID 5253 will be described later with reference to FIG. 28.

FIG. 27 shows the reconfiguration policy table 528 according to the third embodiment of this invention.

The reconfiguration policy table 528 includes a reconfiguration policy ID 5281 and a reconfiguration policy 5282.

The reconfiguration policy ID 5281 is an ID used for identifying a policy adopted in reconfiguring.

The reconfiguration policy 5282 indicates the contents of a reconfiguration policy corresponding to the reconfiguration policy ID 5281. The reconfiguration policy 5282 is, for example, single reconfiguration, recursive reconfiguration to network devices that cover the source network device, or recursive reconfiguration to edge network devices.

The single reconfiguration indicates reconfiguration in which, in the first embodiment, a filter is moved only to a network device 100 adjacent to the network device 100 assigned as a filter source.

The recursive reconfiguration to network devices that cover the source network device indicates reconfiguration in which single reconfiguration is repeated so that a filter is moved to a network device 100 that accommodates all source terminals specified as reconfiguration target filters and that is the most distant from the network device 100 assigned as a filter source.

The recursive reconfiguration to edge network devices indicates reconfiguration in which single reconfiguration is repeated so that a filter is moved to a network device 100 directly coupled to a terminal group 200.

In the example shown in FIG. 27, the reconfiguration policy ID 5281 and the reconfiguration policy 5282 in the first row of the reconfiguration policy table 528 are "1" and "single reconfiguration", respectively. This indicates that the reconfiguration policy defined by the reconfiguration policy ID "1" is "single reconfiguration".

FIG. 28 shows an example of a user interface provided by the administrator terminal 700 for the purpose of inputting a value to be stored into the filter type table 525 shown in FIG. 26.

The user interface includes an input field for the filter type 5251, an input field for the reconfiguring priority 5252, and an input field for the reconfiguration policy ID 5253. When an "OK" button is operated, a request for adding or changing the filter type 5251, the reconfiguring priority 5252, and the reconfiguration policy ID 5253 is issued to the management server 500. When a value stored in the filter type table 525 is to be changed, a field for specifying the information concerning the filter already set is further included. Then, the filter type 5251 and the reconfiguring priority 5252 to be changed are input for the information concerning the specified filter.

FIG. 29 shows the setting history table 527 according to the third embodiment of this invention.

The first row of the setting history table 527 is a setting history of a reconfigured filter in the case of a reconfiguration policy of "recursive reconfiguration to network devices that cover the source network device". Specifically, a filter set in the port 3 of the network device 100A is moved and set into the port 3 of the network device 100D.

The second row of the setting history table 527 is a setting history of a reconfigured filter in the case of a reconfiguration policy of "recursive reconfiguration to edge network devices". Specifically, a filter set in the port 3 of the network device 100A is distributed and set into the port 3 of the network device 100G and the port 3 of the network device 100H.

Figure 30:
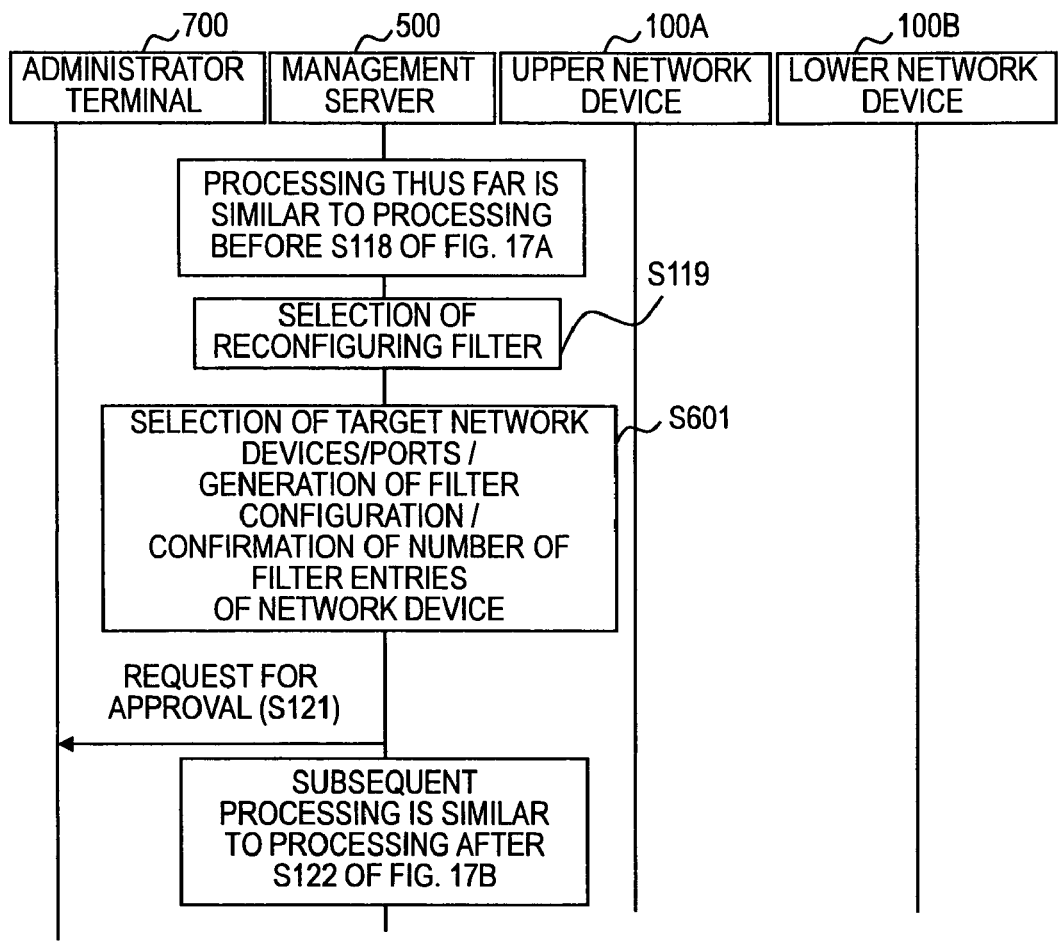
FIG. 30 is a sequence diagram showing filter reconfiguration in accordance with the third embodiment of this invention.

FIG. 30 is a sequence diagram showing filter reconfiguration according to the third embodiment of this invention.

The steps to Step S119 in the reconfiguration target filter selection shown in FIG. 30 are the same as the steps to Step S119 shown in FIG. 17B according to the first embodiment. Thus, their description is omitted.

After the processing in Step S119, the management server 500 performs selection of target network devices/ports, generation of filter configuration, and confirmation of the number of filter entries of the network device (referred to as recursive reconfiguration, hereinafter) (S601). The recursive reconfiguration will be described later in detail with reference to FIG. 31.

Then, the management server 500 transmits an approval request to the administrator terminal 700 (S121). The processing in Step S121 and the subsequent steps is the same as the processing in Step S122 and the subsequent steps of FIG. 17B. Thus, its description is omitted.

Figure 31A:
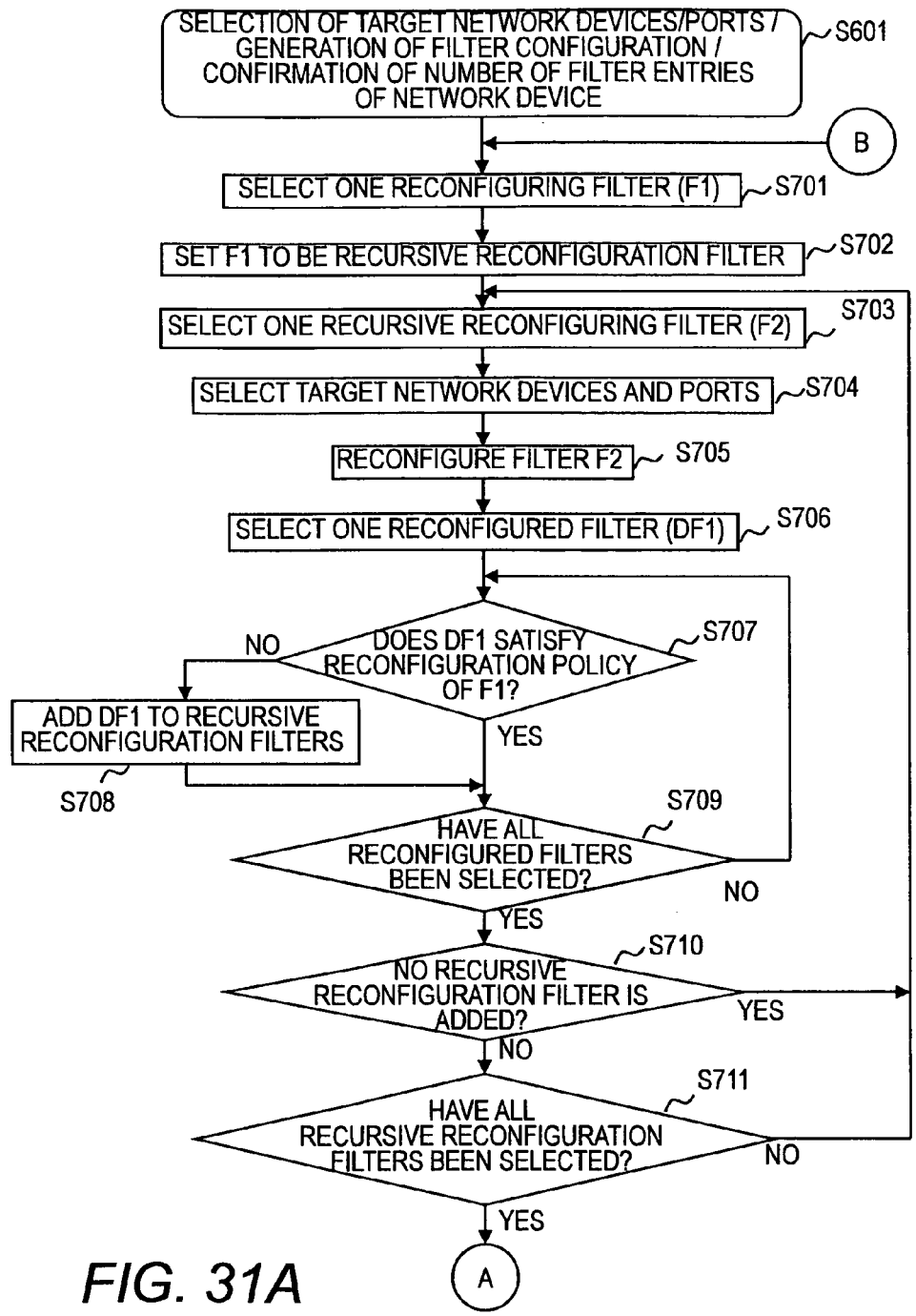
FIGS. 31A and 32B are explanatory diagrams showing a flow chart showing recursive reconfiguration in accordance with the third embodiment of this invention.
Figure 31B:
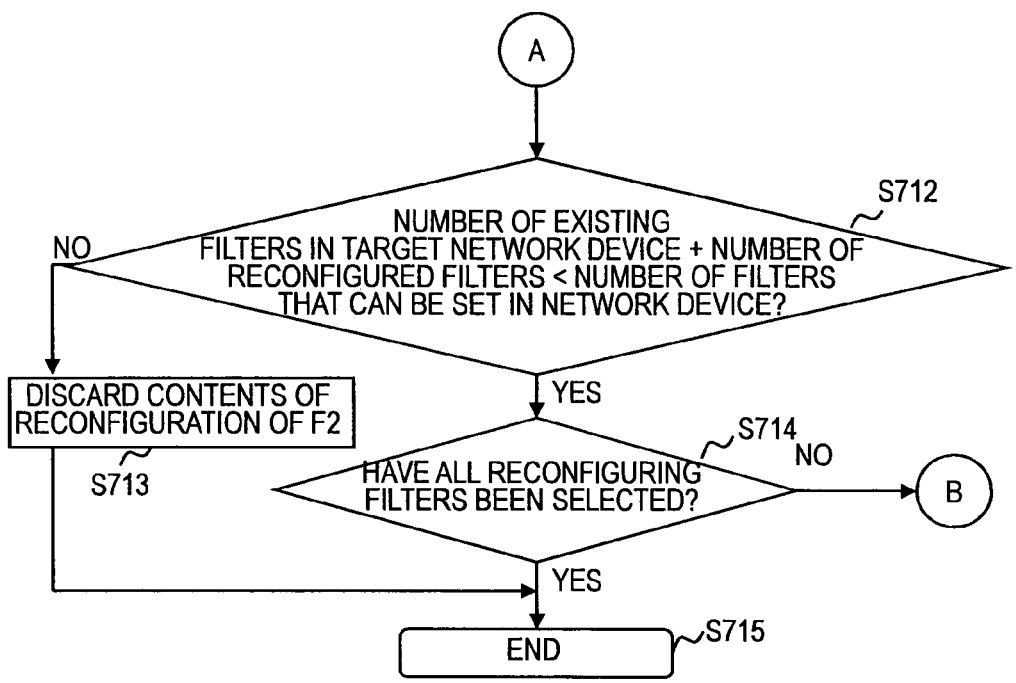

FIGS. 31A and 31B show flow charts of the recursive reconfiguration according to the third embodiment of this invention.

First, the management server 500 selects one reconfiguring filter F1 (S701).

Then, the management server 500 sets as a recursive reconfiguring filter the reconfiguring filter F1 selected in Step S701 (S702).

Then, the management server 500 selects one recursive reconfiguring filter F2 from the recursive reconfiguring filters set in Step S702 (S703).

Then, the management server 500 performs selection of target network devices/ports (S704). The details of the selection of target network devices/ports are the same as those in the flow chart shown in FIG. 20. Thus, their description is omitted.

Then, the management server 500 performs generation of filter configuration for the recursive reconfiguring filter F2 selected in Step S703 (S705). The details of the generation of filter configuration are the same as those in the flow chart shown in FIG. 21. Thus, their description is omitted.

Then, the management server 500 selects one filter DF1 from the filters reconfigured in Step S705 (S706).

Then, the management server 500 determines whether the filter DF1 selected in Step S706 satisfies the reconfiguration policy of the reconfiguring filter F1 (S707). This determination is performed, for example, as follows.

In the case of a reconfiguration policy of single reconfiguration, when the network device 100 in which the filter DF1 is set and the network device 100 in which the reconfiguring filter F1 is set are adjacent to each other, the reconfiguration policy is satisfied.

In the case of a reconfiguration policy of recursive reconfiguration to network devices that cover the source network device, referring to the IP network topology table 522 shown in FIG. 3, a network device 100 is calculated that accommodates all source addresses of the reconfiguring filter F1 and that is the most distant (coupled via largest number of network devices 100) from the network device 100 in which the reconfiguring filter F1 is set. When the calculated network device is the same as the network device 100 in which the filter DF1 is to be set, the reconfiguration policy is satisfied.

In the case of a reconfiguration policy of recursive reconfiguration to edge network devices, referring to the IP network topology table 522 shown in FIG. 3, a network device 100 directly coupled to the terminal group 200 is calculated. When the calculated network device 100 is the same as the network device 100 in which the filter DF1 is to be set, the reconfiguration policy is satisfied.

When the filter DF1 does not satisfy the reconfiguration policy of the reconfiguring filter F1, the filter DF1 needs to be reconfigured. Thus, the procedure goes to Step S708. In contrast, when the filter DF1 satisfies the reconfiguration policy of the reconfiguring filter F1, the procedure goes to Step S709.

In Step S708, the management server 500 adds the filter DF1 to the recursive reconfiguration filters (S708). Then, the procedure goes to Step S709.

Then, the management server 500 determines whether all filters reconfigured in Step S706 have been selected (S709).

When all reconfigured filters are not yet selected, the procedure returns to the processing in Step S706. In contrast, when all reconfigured filters have been selected, the procedure goes to Step S710.

Then, the management server 500 determines whether a recursive reconfiguration filter has been added (S710).

When a recursive reconfiguration filter has been added, for the purpose of reconfiguring the added recursive reconfiguration filter, the added recursive reconfiguration filter is set again as a recursive reconfiguring filter. Then, the procedure returns to the processing in Step S703. In contrast, when a recursive reconfiguration filter is not added, the procedure goes to Step S711.

Then, the management server 500 determines whether all recursive reconfiguration filters have been selected (S711).

When all recursive reconfiguration filters are not yet selected, the procedure returns to the processing in Step S703. In contrast, when all recursive reconfiguration filters have been selected, the procedure goes to Step S712.

Then, the management server 500 checks the number of entries of filters set in the network device 100 serving as a setting target of the filter (S712). Specifically, it is determined whether, in the network device 100 serving as a setting target of the filter, the total of the number of existing set filters and the number of reconfigured filters to be set is smaller than the number of filters that can be set in each network device 100.

When the value is greater than the number of filters that can be set in each network device 100, the procedure goes to Step S713. In contrast, when the value is smaller than the number of filters that can be set in each network device 100, the procedure goes to Step S714.

In Step S713, in order to terminate the processing in a state where the processing of the reconfiguring filter reconfigured in the preceding process is validated, the management server 500 discards the contents of the reconfiguration of the "F2" which is a filter entry exceeding the capacity (S713). Then, the processing is terminated.

In Step S714, the management server 500 determines whether all reconfiguring filters have been selected (S714).

When all reconfiguring filters are not yet selected, the procedure returns to the processing in Step S701. In contrast, when all reconfiguring filters have been selected, the processing is terminated.

Fourth Embodiment

A network system according to a fourth embodiment of this invention will be described below with reference to FIGS. 32 and 33.

The fourth embodiment is characterized in that the administrator terminal 700 specifies a network device 100 and a port serving as a setting target of a filter as well as the contents of the filter entry, and then requests setting of the filter to the management server 500, the management server 500 reconfigures the specified filter and distributes the specified filter to other network devices 100, and the configuration of the distributed filter is set in the network devices 100.

Figure 32A:
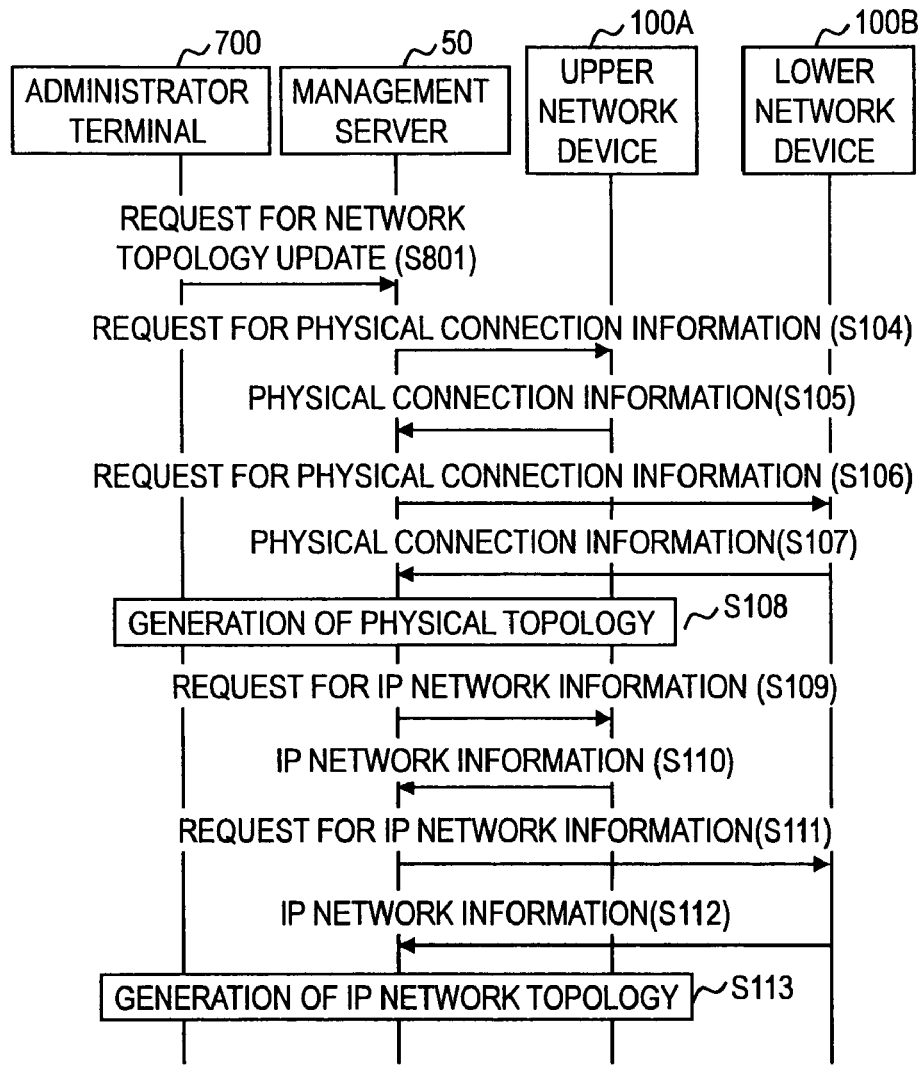
Figure 32B:
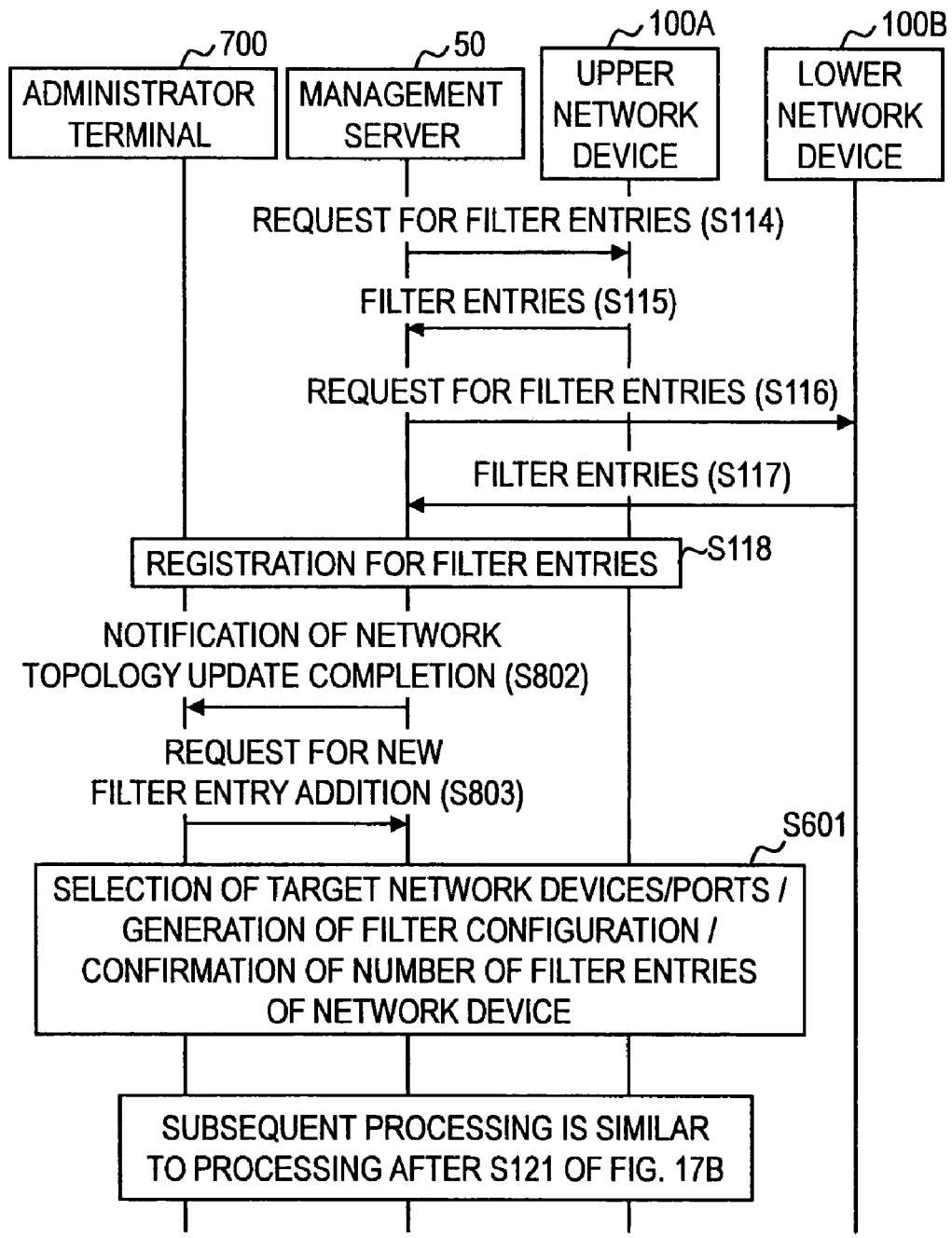

FIGS. 32A and 32B are sequence diagrams showing filter reconfiguration according to the fourth embodiment of this invention. FIG. 33 is a diagram describing a message transmitted and received in the filter reconfiguration according to the fourth embodiment of this invention.

First, the administrator terminal 700 requests update of the network topology to the management server 500 (S801).

Then, the management server 500 requests physical coupling information from the upper network device 100A and the lower network device 100B (S104). This processing is the same as the processing in Step S104 of FIG. 17A. Further, the processing from Step S104 to the registration for filter entries in Step S118 is the same as the processing from Steps S104 to S118 according to the first embodiment shown in FIG. 17A. Thus, their description is omitted.

Then, the management server 500 notifies the administrator terminal 700 of the completion of update of the network topology (S802).

Then, using a message (request for new filter entry addition) shown in FIG. 33, the administrator terminal 700 requests addition of a new filter entry, to the management server 500 (S803). The message used in Step S803 includes a network device 100 serving as a setting target of the filter, a port serving as a setting target of the filter, and contents of the filter entry.

An user interface in the administrator terminal 700 used by the administrator for specifying the network device 100 serving as a setting target of the filter, the port serving as a setting target of the filter, and the filter entry is shown in FIG. 34 described later.

Then, assigning the requested filter entry as a reconfiguring filter, the management server 500 performs recursive reconfiguration (S601). The processing in Step S601 is the same as the processing in Step S601 of FIG. 29 according to the third embodiment. Further, the processing in Step S601 and the subsequent steps is the same as the processing shown in FIG. 29. Thus, their description is omitted.

FIG. 34 shows an example of a user interface provided by the administrator terminal 700 for the purpose of inputting the network device 100 serving as a setting target of a newly added filter, the port serving as a setting target of the filter, and the contents of the filter entry.

The user interface includes an input field for a network device 100 serving as a setting target, an input field for a port serving as a setting target of the filter, and an input field for the filter entry. When an "OK" button is operated, a request that specifies the network device 100 serving as a setting target, the port serving as a setting target of the filter, and the contents of the filter entry is issued to the management server 500 (S803).

While the present invention has been described in detail and pictorially in the accompanying drawings, the present invention is not limited to such detail but covers various obvious modifications and equivalent arrangements, which fall within the purview of the appended claims.

What is claimed is:

1. A network system, comprising:
   a plurality of network devices for forwarding a packet;
   a network constructed from the plurality of network devices; and
   a management server coupled to the network and managing the network, wherein:
   the plurality of network devices include a first network device having one or more filters and a second network device coupled at a lower level of the network constructed from the plurality of network devices than the first network device such that the second network device is located closer to a terminal end of the network than the first network device along a path from an external network through the first network device; and
   the management server is configured to:
   determine a number of the one or more filters of the first network device to assign as a target of reconfiguration based on a load of a processor of the first network device;
   obtain topology of the network from the plurality of network devices;
   reconfigure, by referring to the obtained network topology, a filter of the first network device that is assigned as a target of reconfiguration and a filter of the second network device such that a range in which packets can be forwarded through reconfiguring filter set in the first network device is distributed to the second network device; and
   set the reconfigured filters into the first network device and the second network device to configure the second network device to forward packets through the range in which packets were forwarded through the reconfiguring filter of the first network device.

2. The network system according to claim 1 wherein the management server is configured to:
   identify, among network devices directly coupled to the first network device, a second network device for accommodating a source terminal included in a condition of the filter assigned as the target of reconfiguration;
   specify a port of the second network device, which is coupled to the first network device, as a port in which the filter is to be set;
   determine whether the range in which a packet can be forwarded through the filter set in the second network, device is equal to the range in which a packet can be forwarded through the filter set in the first network device; and
   reconfigure, in the case of which the ranges in which a packet can be forwarded are determined as not equal to each other, the lifter of the second network device such that a permission filter whose source address is a source address contained in the condition of the filter assigned as the target of reconfiguration set in the first network device and whose destination address is a terminal accommodated in the first network device and not accommodated in the second network device is set in the specified port.

3. The network system according to claim 2, wherein:
   the management server is further configured to determine the number of filters assigned as targets of reconfiguration by at least one of the following methods (1) and (2):
   (1) load information of the processor of the first network device is obtained from the first network device, and then the number of filters assigned as targets of reconfiguration is determined according to the obtained load information of the processor based on a comparison result between the obtained load information and a predetermined threshold; and (2) the number of filters specified through an interface provided in the management server is determined as the number of filters assigned as targets of reconfiguration; and reconfigure the determined number of filters.

4. The network system according to claim 2, wherein the management server is configured to:

manage information concerning a type of the filter set in the first network device;

determine to priority of the filter assigned as a target of reconfiguration by at least one of the following methods (1) and (2):

(1) the type of the filter sot in the first network device is judged with reference to the managed information concerning the type of the filter, and then the priority of the filter assigned as a target of reconfiguration is determined according to the judged type of the filter; and (2) a priority for the filter specified through an interface provided in the management server is determined as the priority of the filter assigned as a target of reconfiguration; and select, based on the determined priority; a filter to be assigned as a target of reconfiguration.

5. The network system according to claim 2, wherein:

the network topology includes physical coupling information of the network and logical coupling information of the network; and the management server is configured to use the network topology to select a second network device coupled at a lower level of the first network device.

6. The network system according to claim 2, wherein:

the management server comprises an interface for receiving specification of the filter assigned as a target of reconfiguration and a network device and a port before the reconfiguration of the filter, and a request of reconfiguration of the filter and setting into a real network device; and the management server is configured to reconfigure the filter of the network device and the port specified through the interface.

7. The network system according to claim 2, wherein:

the plurality of network devices further include a third network device coupled at a lower level of the second network device; and the management server is configured to:

newly specify as a filter assigned as a target of reconfiguration the filter set in the second network device in which a configuration of the filter has been changed;

reconfigure the filter of the second network device and a filter of the third network device such that a range in which a packet can be forwarded through the reconfiguring filter set in the second network device is made equal to a range in which a packet can be forwarded through the filter set in the third network device;

set the reconfigured filters into the second network device and the third network device; and set as a filter assigned as a target of reconfiguration the filter set in the third network device, and repeat the reconfiguration for the filters.

8. The network system according to claim 7, wherein:

the plurality of network devices further include a fourth network device coupled at a lower level of the second network device; and the management server is configured to:

identify the fourth network device by at least one of the following methods (1) and (2):

(1) with referring to the network topology, the fourth network device is identified that directly accommodates a source terminal contained in a condition of the filter assigned as a target of reconfiguration; and (2) with referring to the network topology, the fourth network device is identified that accommodates all source terminals contained in a condition of the filter assigned as a target of reconfiguration; and repeat the reconfiguration for the filters until the configuration of the filter of the identified fourth network device is changed.

9. The network system according to claim 7, wherein:

the management server has an interface for receiving specification of a policy, according to the type of the filter, whether the filter set in the second network device in which the configuration of the filter has been changed is to be newly specified as a filter assigned as a target of reconfiguration; and the management server determines whether the reconfiguration for the filters is to be repeated based on the specified policy.

10. A management server provided in a network system including a plurality of network devices for forwarding a packet and a network constructed from the plurality of network devices, the plurality of network devices include a first network device having one or more filters and a second network device coupled at a lower level of the network constructed from the plurality of network devices than the first network device such that the second network device is located closer to a terminal end of the network than the first network device along a path from an external network through the first network device the management server being configured to:

determine a number of the one or more filters of the first network device to assign as a target of reconfiguration based on a load of a processor of the first network device for performing filter processing, obtain topology of the network from the plurality of network devices;

reconfigure, by referring to the obtained network topology, a filter of the first network device that is assigned as a target of reconfiguration and a filter of the second network device such that a range in which packets can be forwarded through the reconfiguring filter set in the first network device is distributed to the second network device; and set the reconfigured filters into the first network device and the second network device to configure the second network device to forward packets through the range in which packets were forwarded through the reconfiguring filter of the first network device.

11. The management server according to claim 10, wherein the management server is configured to:

identify, among network devices directly coupled to the first network device, a second network device for accommodating a source terminal included in a condition of the filter assigned as the target of reconfiguration;

specify a port of the second network device, which is coupled to the first network device, as a port in which the filter is to be set, determine whether the range in which a packet can be forwarded through the filter set in the second network device is equal to the range in which a packet can be forwarded through the filter set in the first network device; and reconfigure, in the case of which the ranges in which a packet can be forwarded are determined as not equal to each other, the filter of the second network device such that a permission filter whose source address is a source address contained in the condition of the filter assigned as the target of reconfiguration set in the first network device and whose destination address is a terminal accommodated in the first network device and not accommodated in the second network device is set in the specified port.

12. The management server according to claim 11, wherein:

the management server is configured to:

wherein the management server is further configured to determine the number of filters assigned as targets of reconfiguration by at least one of the following methods (1) and (2):

(1) load information of the processor of the first network device is obtained from the first network device, and then the number of filters assigned as targets of reconfiguration is determined according to the load information of the processor based on a comparison result between the obtained load information and a predetermined threshold; and (2) the number of fitters specified through an interface provided in the management server is determined as the number of filters assigned as targets of reconfiguration; and reconfigure the determined number of filters.

13. The management server according to claim 11, wherein the management server is configured to:

manage information concerning a type of the filter set in the first network device;

determine a priority of the filter assigned as a target of reconfiguration by at least one of the following methods (1) and (2):

(1) the type of the filter set in the first network device is judged with reference to the managed information concerning the type of the filter, and then the priority of the filter assigned as a target of reconfiguration is determined according to the judged type of the filter; and (2) a priority for the filter specified through an interface provided in the management server is determined as the priority of the filter assigned as a target of reconfiguration; and select, based on the determined priority, a filter to be assigned as a target of reconfiguration.

14. The management server according to claim 11, wherein:

the network topology includes physical coupling information of the network and logical coupling information of the network; and the management server is configured to use the network topology to select a second network device coupled at a lower level of the first network device.

15. The management server according to claim 11, further comprising an interface for receiving specification of the filter assigned as a target of reconfiguration and a network device and a port before the reconfiguration of the filter, and a request of reconfiguration of the filter and setting into a real network device; and the management server is configured to reconfigure the filter of the network device and the port specified through the interface.

16. The management server according to claim 11, wherein:

the plurality of network devices further include a third network device coupled at a lower level of the second network device; and the management server is configured to:

newly specify as a filter assigned as a target of reconfiguration the filter set in the second network device in which a configuration of the filter has been changed;

reconfigure the filter of the second network device and a filter of the third network device such that a range in which a packet can be forwarded through the reconfiguring filter set in the second network device is made equal to a range in which a packet can be forwarded through the filter set in the third network device;

set the reconfigured filters into the second network device and the third network device; and set as a lifter assigned as a target of reconfiguration the filter set in the third network device, and repeat the reconfiguration for the litters.

17. The management server according to claim 16, wherein:

the plurality of network devices further include a fourth network device coupled at a lower level of the second network device; and the management server is configured to:

identify the fourth network device by at least one of the following methods (1) and (2):

(1) with referring to the network topology, the fourth network device is identified that directly accommodates a source terminal contained in a condition of the filter assigned as a target of reconfiguration; and (2) with referring to the network topology, the fourth network device is identified that accommodates all source terminals contained in a condition of the filter assigned as a target of reconfiguration; and repeat the reconfiguration for the filters until the configuration of the filter of the identified fourth network device is changed.

18. The management server according to claim 16, wherein:

the management server has an interlace for receiving specification of a policy, according to the type of the filter, whether the filter set in the second network device in which the configuration of the filter has been changed is to be newly specified as a filter assigned as a target of reconfiguration; and the management server determines whether the reconfiguration for the filters is to be repeated based on the specified policy.

19. A filter reconfiguration method executed in a network system including a plurality of network devices for forwarding a packet, a network constructed from the plurality of network devices, and a management server coupled to the network and managing the network, the plurality of network devices include a first network device having one or more filters and a second network device coupled at a lower level of the network device constructed from the plurality of network devices than the first network device such that the second network device is located closer to a terminal end of the network than the first network device along a path from an external network through the first network device, the filter reconfiguration method comprising:

determining a number of the one or more filters of the first network device to assign as a target of reconfiguration based on a load of a processor of the first network device for performing filter processing;

acquiring topology of the network from die plurality of network devices;

reconfiguring, with referring to the obtained network topology, a filter of the first network device that is assigned as a target of reconfiguration and a filter of the second network device such that a range in which packets can be forwarded through the reconfiguring filter set in the first network device is distributed to the second network device; and setting the reconfigured filters into the first network device and the second network device to configure the second network device to forward packets through the range in which packets were forwarded through the reconfiguring filter of the first network device.

* * * * *